United States Patent
Tashiro et al.

(10) Patent No.: US 8,072,526 B2
(45) Date of Patent: Dec. 6, 2011

(54) IMAGE SENSOR, IMAGING SYSTEM, AND IMAGE SENSOR CONTROL METHOD

(75) Inventors: Kazuaki Tashiro, Ebina (JP); Noriyuki Kaifu, Mobara (JP)

(73) Assignee: Canon Kabushiki Kaisha, Tokyo (JP)

( * ) Notice: Subject to any disclaimer, the term of this patent is extended or adjusted under 35 U.S.C. 154(b) by 402 days.

(21) Appl. No.: 12/428,105

(22) Filed: Apr. 22, 2009

(65) Prior Publication Data

US 2009/0268050 A1    Oct. 29, 2009

(30) Foreign Application Priority Data

Apr. 28, 2008  (JP) ................. 2008-117628

(51) Int. Cl.
H04N 5/335    (2011.01)

(52) U.S. Cl. ..................................... 348/308

(58) Field of Classification Search ............ 348/308, 348/394; 257/290, 291
See application file for complete search history.

(56) References Cited

U.S. PATENT DOCUMENTS

| 7,432,968 B2 | 10/2008 | Fowler | 348/308 |
| 2003/0025816 A1* | 2/2003 | Sakuragi | 348/301 |

FOREIGN PATENT DOCUMENTS

| JP | 2005-322901 | 11/2005 |
| JP | 2007-60500 | 3/2007 |

OTHER PUBLICATIONS

M. Snoeji, et al., "The Effect of Switched Biasing on 1/f Noise in CMOS Imager Front-Ends", *2005 IEEE Workshop on Charge-Coupled Devices and Advanced Image Sensors*, Jun. 2005, pp. 68-71.

* cited by examiner

*Primary Examiner* — Hung Dang
(74) *Attorney, Agent, or Firm* — Fitzpatrick, Cella, Harper & Scinto

(57) ABSTRACT

An image sensor comprises a pixel array, and a control unit which performs, in a first period, a control operation of an electric potential of a signal line to turn off a MOS transistor while the electric potential of a charge-voltage converter in a selected pixel is maintained at an electric potential of a selected state, and, in a second period subsequent to the first period, performs a control operation of the electric potential of the signal line to turn on the MOS transistor while the electric potential of the charge-voltage converter in the selected pixel is maintained at an electric potential of the selected state.

9 Claims, 12 Drawing Sheets

IMAGE SENSOR, IMAGING SYSTEM, AND IMAGE SENSOR CONTROL METHOD

BACKGROUND OF THE INVENTION

1. Field of the Invention

The present invention relates to an image sensor, an imaging system, and an image sensor control method.

2. Description of the Related Art

Imaging systems such as a digital cameras and video camcorders sometimes adopt a MOS image sensor. In some cases, a MOS image sensor S will have an arrangement as shown in FIG. 10.

The image sensor S includes a pixel array PA, a vertical scanning circuit 15, noise reduction circuits 10-1 to 10-m, horizontal transfer switches 16-1 to 16-m, a horizontal scanning circuit 14, and an output amplifier 17.

In the pixel array PA, a plurality of pixels P11 to Pnm are arrayed two-dimensionally (in the row and column directions).

The vertical scanning circuit 15 scans the pixel array PA in the vertical direction via row control lines. The row control lines include selection row control lines 101-1 to 101-n, reset row control lines 102-1 to 102-n, and transfer row control lines 103-1 to 103-n. The vertical scanning circuit 15 selects a row of the pixel array PA.

The noise reduction circuits 10-1 to 10-n read out N and S signals at different timings via column signal lines 8-1 to 8-n from the pixels of respective columns on a selected row. The noise reduction circuits 10-1 to 10-n execute CDS processing to generate the difference signals between N and S signals, obtaining noise-free signals.

The horizontal scanning circuit 14 sequentially turns on the horizontal transfer switches 16-1 to 16-n to sequentially transfer the difference signals of the pixels of respective columns on a selected row to the output amplifier 17.

The output amplifier 17 amplifies the difference signals, and outputs them from an output terminal 18.

The arrangement of each pixel P11 to Pnm in the pixel array PA will be explained with reference to FIG. 11. Although the arrangement of the pixel P11 will be exemplified, the arrangements of the remaining pixels P12 to Pnm are also equivalent to that of the pixel P11.

The pixel P11 includes a photodiode 1, amplification MOS transistor 2, selection MOS transistor 3, reset MOS transistor 4, transfer MOS transistor 6, and floating diffusion (FD) 7.

The photodiode 1 generates and accumulates charges corresponding to incident light. Upon receiving an active-level transfer signal from the vertical scanning circuit 15 via the transfer row control line 103-1, the transfer MOS transistor 6 is turned on to transfer the charges of the photodiode 1 to the FD 7. The FD 7 converts the transferred charges into a voltage in accordance with its own parasitic capacitance. Upon receiving an active-level selection signal from the vertical scanning circuit 15 via the selection row control line 101-1, the selection MOS transistor 3 is turned on to select the pixel P11. Upon receiving an inactive-level selection signal from the vertical scanning circuit 15 via the selection row control line 101-1, the selection MOS transistor 3 is turned off to deselect the pixel P11. In the selected state, the amplification MOS transistor 2 performs a source follower operation together with a constant current source 5 connected to the column signal line 8-1, outputting a signal corresponding to the voltage of the FD 7 to the column signal line 8-1. Upon receiving an active-level reset signal via the reset row control line 102-1, the reset MOS transistor 4 is turned on to reset the FD 7. The drains of the reset MOS transistor 4 and amplification MOS transistor 2 are connected to a power supply line SL for supplying constant power.

Recently, there has been a need to increase the number of pixels in pixel array of an image sensor. To increase the number of pixels in a predetermined area which is required for the pixel array, the pixel size is sometimes decreased. In each pixel P11 to Pnm, if the gate width and gate length of the amplification MOS transistor 2 are decreased along with this, random noise in a signal output from the amplification MOS transistor 2 in each pixel P11 to Pnm to each column signal line 8-1 to 8-n specifically increases as shown in FIG. 12.

FIG. 12 shows the distribution of random noise in the pixel array PA that is obtained by processing the dark outputs (N signals) of a plurality of frames. In FIG. 12, the abscissa axis represents the magnitude (standard deviation of dark outputs) of random noise of each pixel, and the ordinate axis represents the number of pixels.

FIG. 12 shows that, in region A, the first component, which exhibits almost a normal distribution, is contained in the random noise. The first component fluctuates randomly between pixels in each frame.

FIG. 12 shows that, in region B, the second component, which exhibits an exponential distribution, is contained in the random noise. The second component will be called flicker noise. As shown in FIG. 13, a specific pixel generates flicker noise (second component) with a specific magnitude (much larger than the first component).

FIG. 13 shows temporal fluctuations of a dark output from a specific pixel in region B. As shown in FIG. 13, flicker noise tends to repeat two, H-and L-level values at random.

Flicker noise is associated with 1/f noise depending on the driving frequency, and often generated from a MOS transistor in a pixel. More specifically, flicker noise depends on the product (gate area) of the gate length L and gate width W of the MOS transistor. In the amplification MOS transistor 2 in which the gate area is set small, flicker noise of a specific pixel increases specifically in the plurality of pixels. Accordingly, random noise including the flicker noise in a signal output from the amplification MOS transistor 2 of a specific pixel to the column signal line sometimes increases specifically in the plurality of pixels.

Flicker noise of a specific pixel stands out as a white spot in an image obtained upon low-illuminance shooting. In particular, a white spot becomes very conspicuous in an image obtained by movie video shooting at low illuminance.

To solve this problem, a reference "M. F. Snoeij, et al., "The Effect of Switched Biasing on 1/f Noise in CMOS Imager Front-Ends", (US), 2005 IEEE Workshop on Charge-Coupled Devices and Advanced Image Sensors, June 2005, pp. 68-71" (to be referred to as non-patent reference 1 hereinafter) proposes switching an amplification MOS transistor in the pixel of an image sensor between two, ON and OFF states by a switched basing method. More specifically, before the amplification MOS transistor of a pixel outputs a signal to a column signal line, a switching circuit connected to the column signal line turns off the amplification MOS transistor by increasing the electric potential of the column signal line to VDD once. According to the non-patent reference 1, 1/f noise of the amplification MOS transistor can be reduced, reducing flicker noise.

Japanese Patent Laid-Open No. 2005-322901 proposes a method of controlling the substrate electric potential of an amplification MOS transistor in an image sensor to change the amplification MOS transistor in a pixel to an accumulation mode and turn it off, and then change the amplification MOS transistor to a strong inversion mode and turn it on. According to Japanese Patent Laid-Open No. 2005-322901, before turning on the amplification MOS transistor, trapping of charges in the substrate surface can be inactivated, reducing flicker noise.

Japanese Patent Laid-Open No. 2007-060500 proposes a method of changing the electric potential of an FD to the ground electric potential before turning on an amplification MOS transistor in an image sensor. According to Japanese Patent Laid-Open No. 2007-060500, before turning on the amplification MOS transistor, it can reliably change to an accumulation state, reducing flicker noise.

The technique described in the non-patent reference 1 may not be able to reduce flicker noise when the number of pixels in the pixel array increases. More specifically, as the number of selection MOS transistors connected to each signal line increases, their parasitic capacitances become non-negligible. As a result, it becomes difficult to quickly increase the electric potential of the column signal line to the electric potential VDD or quickly decrease it to a predetermined electric potential by a switching circuit connected to a column signal line. This provides a possibility that no amplification MOS transistor can be turned off/on quickly and that thereby no flicker noise may be reduced.

Also, the technique disclosed in Japanese Patent Laid-Open No. 2005-322901 may not be able to reduce flicker noise if the number of pixels in the pixel array increases. More specifically, as the number of amplification MOS transistors in the pixel array increases, their substrate capacitances become non-negligible. It becomes difficult to increase the substrate electric potential of the amplification MOS transistor from low level to high level or decrease it from high level to low level quickly. This provides a possibility that no amplification MOS transistor can be turned off/on quickly and that thereby no flicker noise may be reduced.

The technique disclosed in Japanese Patent Laid-Open No. 2007-060500 turns off/on an amplification MOS transistor by controlling the electric potential of an FD to the ground electric potential/power supply electric potential. This provides a possibility that a signal containing flicker noise generated after changing the amplification MOS transistor from the OFF state to the ON state is sometimes output to a signal line and that thereby no flicker noise may be reduced.

For example, when reading out an S signal from a pixel, the amplification MOS transistor changes from the OFF state to the ON state by controlling the electric potential of the FD from the ground electric potential to the power supply electric potential. Then, the transfer MOS transistor is turned on to transfer the charges of the photodiode to the FD. The amplification MOS transistor outputs a signal (S signal) corresponding to the voltage of the FD to the column signal line. That is, after the amplification MOS transistor is turned on to transfer the charges of the photodiode to the FD, it outputs a signal corresponding to the voltage of the FD to the signal line. This provides a possibility that the signal output to the signal line highly likely contains flicker noise.

SUMMARY OF THE INVENTION

It is an aim of the present invention to reduce flicker noise even when the number of pixels in the pixel array increases.

According to the first aspect of the present invention, an image sensor comprises: a pixel array in which a plurality of pixels are arrayed two-dimensionally, each of the plurality of pixels including a photoelectric conversion unit, a charge-voltage converter, a transfer unit which transfers charges generated in the photoelectric conversion unit to the charge-voltage converter, a MOS transistor which outputs a signal based on a voltage of the charge-voltage converter to a signal line, and a setting unit which sets an electric potential of the charge-voltage converter to a first electric potential to set a selected state, and sets the electric potential of the charge-voltage converter to a second electric potential to set a deselected state; and a control unit which performs, in a first period, a control operation of an electric potential of the signal line to turn off the MOS transistor while the electric potential of the charge-voltage converter in a selected pixel is maintained at an electric potential of the selected state, and performs, in a second period subsequent to the first period, a control operation of the electric potential of the signal line to turn on the MOS transistor while the electric potential of the charge-voltage converter in the selected pixel is maintained at an electric potential of the selected state.

According to the second aspect of the present invention, an imaging system comprises: an image sensor according to the first aspect of the present invention; an optical system which forms an image on an image sensing surface of the image sensor; and a signal processing unit which processes a signal output from the image sensor to generate image data.

According to the third aspect of the present invention, a method of controlling an image sensor having a pixel array in which a plurality of pixels are arrayed two-dimensionally, each of the plurality of pixels including a photoelectric conversion unit, a charge-voltage converter, a transfer unit which transfers charges generated in the photoelectric conversion unit to the charge-voltage converter, a MOS transistor which outputs a signal based on a voltage of the charge-voltage converter to a signal line, and a setting unit which sets an electric potential of the charge-voltage converter to a first electric potential to set a selected state, and sets the electric potential of the charge-voltage converter to a second electric potential to set a deselected state, the method comprises: a first step of performing a control operation of an electric potential of the signal line to turn off the MOS transistor while the electric potential of the charge-voltage converter in a selected pixel is maintained at an electric potential of the selected state; and a second step of performing a control operation of, subsequent to the first step, the electric potential of the signal line to turn on the MOS transistor while the electric potential of the charge-voltage converter in the selected pixel is maintained at an electric potential of the selected state.

The present invention can reduce flicker noise even when the number of pixels in the pixel array increases.

Further features of the present invention will become apparent from the following description of exemplary embodiments with reference to the attached drawings.

DESCRIPTION OF THE EMBODIMENTS

Figure 1:
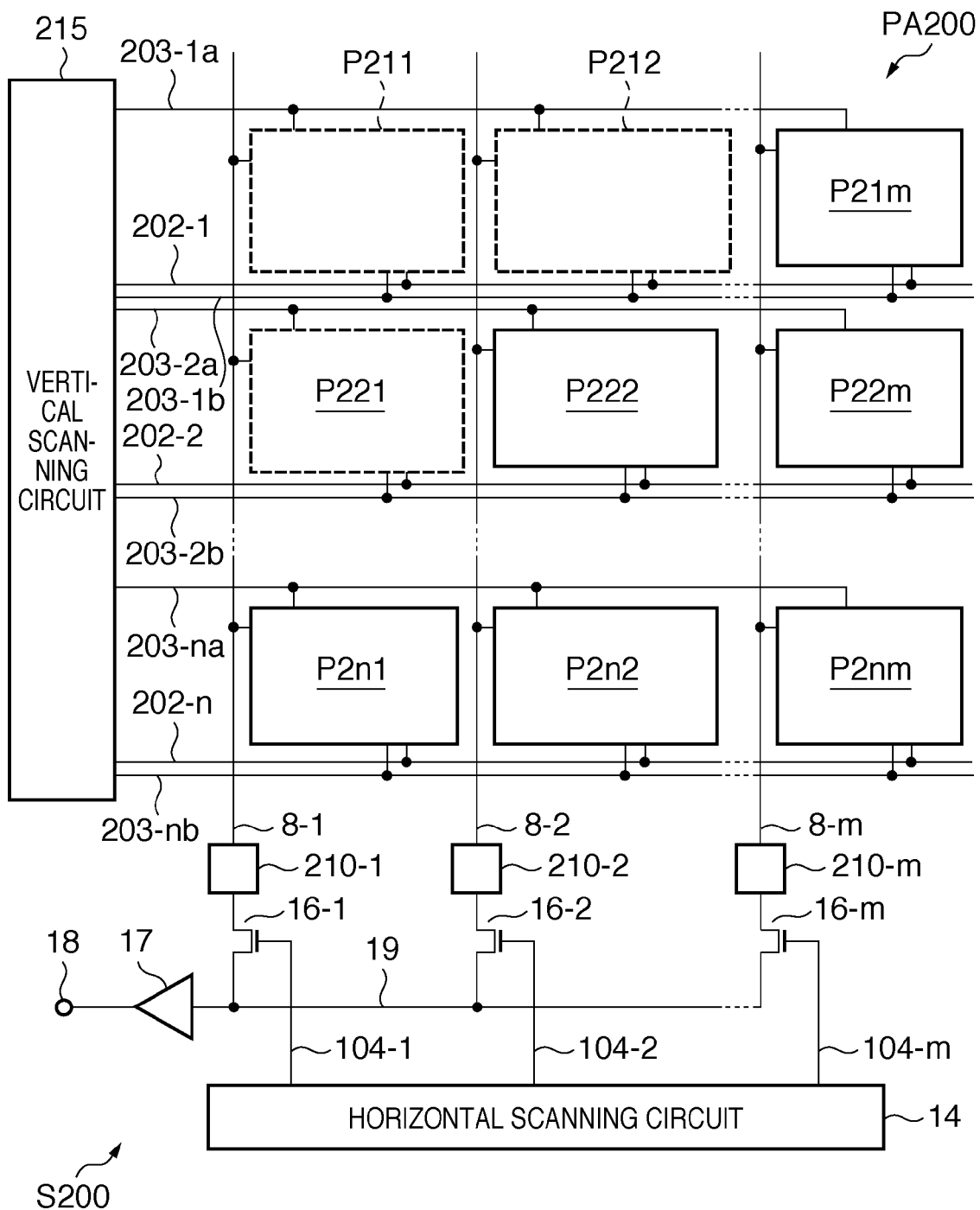
FIG. 1 is a diagram showing the arrangement of an image sensor S200 according to the first embodiment of the present invention.

The present inventor has performed studies to determine that it is effective for reduction of flicker noise to quickly change the amplification MOS transistor of a pixel from the ON state to the OFF state or the OFF state to the ON state.

Meanwhile, the technique described in non-patent reference 1 may not be able to reduce flicker noise when the number of pixels in the pixel array increases. More specifically, as the number of selection MOS transistors connected to each signal line increases, their parasitic capacitances become non-negligible. As a result, it becomes difficult to quickly increase the electric potential of the column signal line to the electric potential VDD or quickly decrease it to a predetermined electric potential by a switching circuit connected to a column signal line. This provides a possibility that no amplification MOS transistor can be turned off/on quickly and that thereby no flicker noise may be reduced.

The technique disclosed in Japanese Patent Laid-Open No. 2005-322901 may not be able to reduce flicker noise if the number of pixels in the pixel array increases. More specifically, as the number of amplification MOS transistors in the pixel array increases, their substrate capacitances become non-negligible. It becomes difficult to increase the substrate electric potential of the amplification MOS transistor from low level to high level or decrease it from high level to low level quickly. This provides a possibility that no amplification MOS transistor can be turned off/on quickly and that thereby no flicker noise may be reduced.

Also, the present inventor has performed studies to determine that it is effective for reduction of flicker noise to make the period until a signal output from the amplification MOS transistor of a pixel to a signal line is read out after turning on the amplification MOS transistor fall within a predetermined period. The period until a signal output from the amplification MOS transistor of a pixel to a signal line is read out after turning on the amplification MOS transistor will be called a post-ON read period.

Within a predetermined period (to be referred to as a transition time T hereinafter) immediately after changing the amplification MOS transistor from an inactive state (OFF state or accumulation state) to an active state (ON state or strong inversion state), electrons (holes) are less likely trapped at the trap level of the interface. Within the transition time T, the signal level of a signal output from the amplification MOS transistor to the signal line tends not to change but to be fixed at H (or L) level.

When the amplification MOS transistor changes to a normal state upon the lapse of the transition time T after turning it on, trapping and emission of electrons (holes) are repeated at trap levels at a given trapping probability. Thus, the signal level of a signal output to the signal line repeats H and L level at random. When the amplification MOS transistor is in the normal state, charges held in the FD are read out as a voltage signal. Accordingly, this signal contains noise (flicker noise) which repeats H and L level at random.

The present inventor considered that the post-ON read period needs to fall within the transition time T until the trapping state at the interface changes to a normal state after the amplification MOS transistor is turned on, in order to reduce flicker noise generated in a specific pixel among a plurality of pixels. That is, the present inventor predicted that flicker noise can be reduced as long as the post-ON read period can fall within the transition time T.

Figure 8:
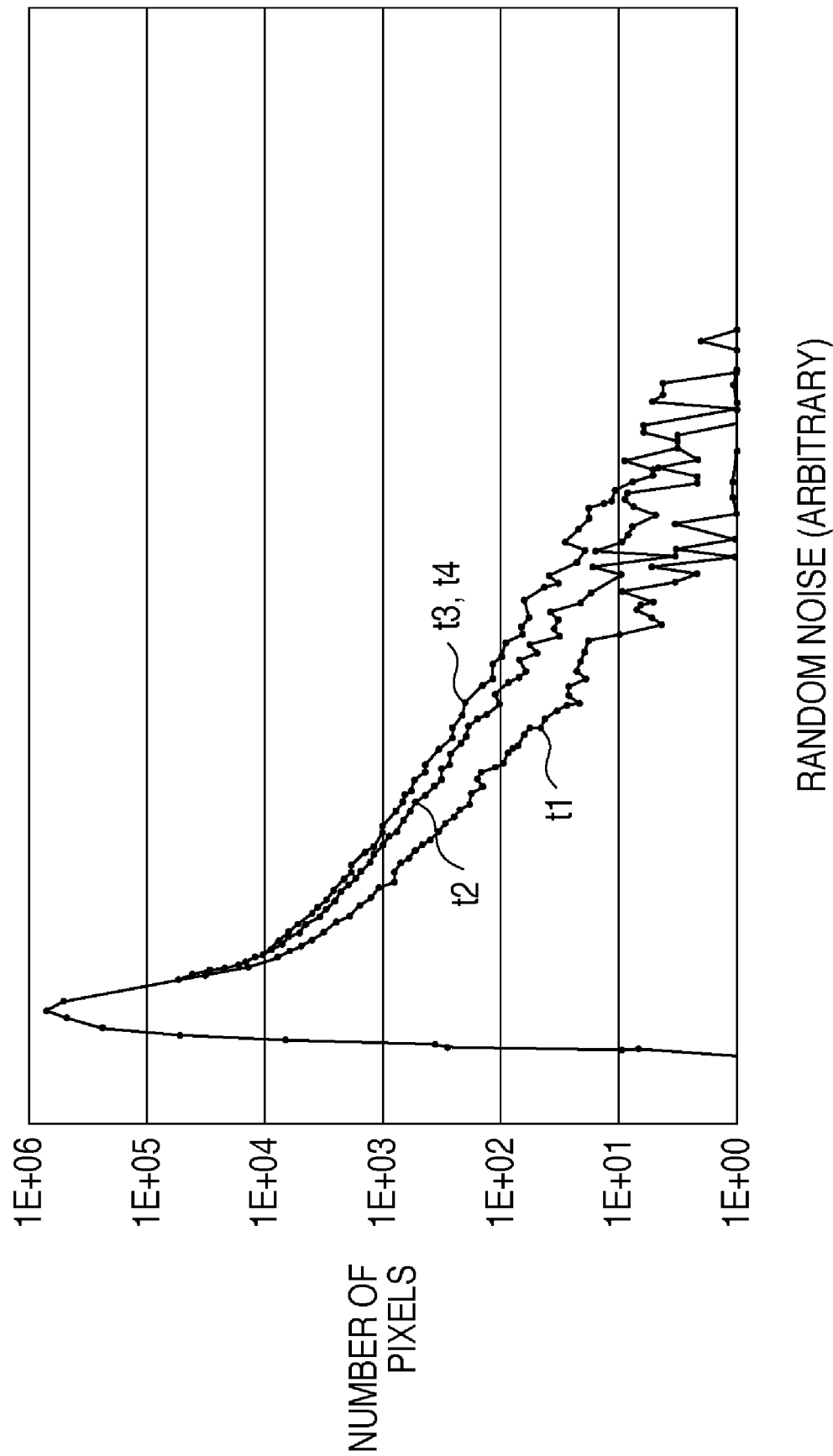
FIG. 8 is a graph for explaining a problem to be solved by the present invention.

Based on these considerations and predictions, the present inventor measured flicker noise while changing the duration of the post-ON read period to $t1<t2<t3=T<t4$. FIG. 8 shows the results. FIG. 8 shows the distribution of random noise in a pixel array PA that is obtained by processing the dark outputs (N signals) of a plurality of frames. In FIG. 8, the abscissa axis represents the magnitude (standard deviation of dark outputs) of random noise of each pixel, and the ordinate axis represents the number of pixels.

When the duration of the post-ON read period is greater than or equal to the transition time T, the flicker noise distribution does not change even by prolonging the duration of the post-ON read period from t3 to t4, as shown in FIG. 8. The transition time T can be obtained from experimentally measured results as the time in which no flicker noise distribution changes.

In contrast, when the duration of the post-ON read period is t1 or t2 which is shorter than the transition time T, flicker noise is reduced compared to that generated when the duration of the post-ON read period is greater than or equal to the transition time T (t3 or t4). When the duration of the post-ON read period is shorter than the transition time T, flicker noise is reduced more as the duration of the post-ON read period decreases from t2 to t1.

As described above, the present inventor has discovered that it is effective for reduction of flicker noise to make the post-ON read period fall within the transition time T. The present inventor has also discovered that it is more effective for reduction of flicker noise to shorten the post-ON read period within the transition time T.

Meanwhile, the technique disclosed in Japanese Patent Laid-Open No. 2007-060500 turns off/on an amplification MOS transistor by controlling the electric potential of an FD to the ground electric potential/power supply electric potential. This provides a possibility that a signal tends to be output from the amplification MOS transistor to the signal line upon the lapse of a predetermined period (transition time T) after turning on the amplification MOS transistor and that thereby flicker noise may be mixed in the signal output to the signal line.

An image sensor S200 according to the first embodiment of the present invention will be explained with reference to FIG. 1. FIG. 1 is a diagram showing the arrangement of the image sensor S200 according to the first embodiment of the present invention.

The image sensor S200 includes a pixel array PA200, a vertical scanning circuit 215, noise reduction circuits (control units) 210-1 to 210-m, horizontal transfer switches 16-1 to 16-m, a horizontal scanning circuit 14, and an output amplifier 17.

In the pixel array PA200, a plurality of pixels P211 to P2nm are arrayed two-dimensionally (in the row and column directions).

The vertical scanning circuit 215 scans the pixel array PA200 in the vertical direction via row control lines. The row control lines include reset row control lines 202-1 to 202-n, and transfer row control lines 203-1a to 203-na and 203-1b to 203-nb. The vertical scanning circuit 215 selects a row of the pixel array PA200.

The noise reduction circuits 210-1 to 210-n read out N and S signals at different timings via column signal lines 8-1 to 8-n from the pixels of respective columns on a selected row. The noise reduction circuits 210-1 to 210-n execute CDS processing to generate the difference signals between N and S signals, obtaining noise-free signals.

The horizontal scanning circuit 14 sequentially turns on the horizontal transfer switches 16-1 to 16-n to sequentially transfer the difference signals of the pixels of respective columns on a selected row to the output amplifier 17.

The output amplifier 17 amplifies the difference signals, and outputs them from an output terminal 18.

Figure 2:
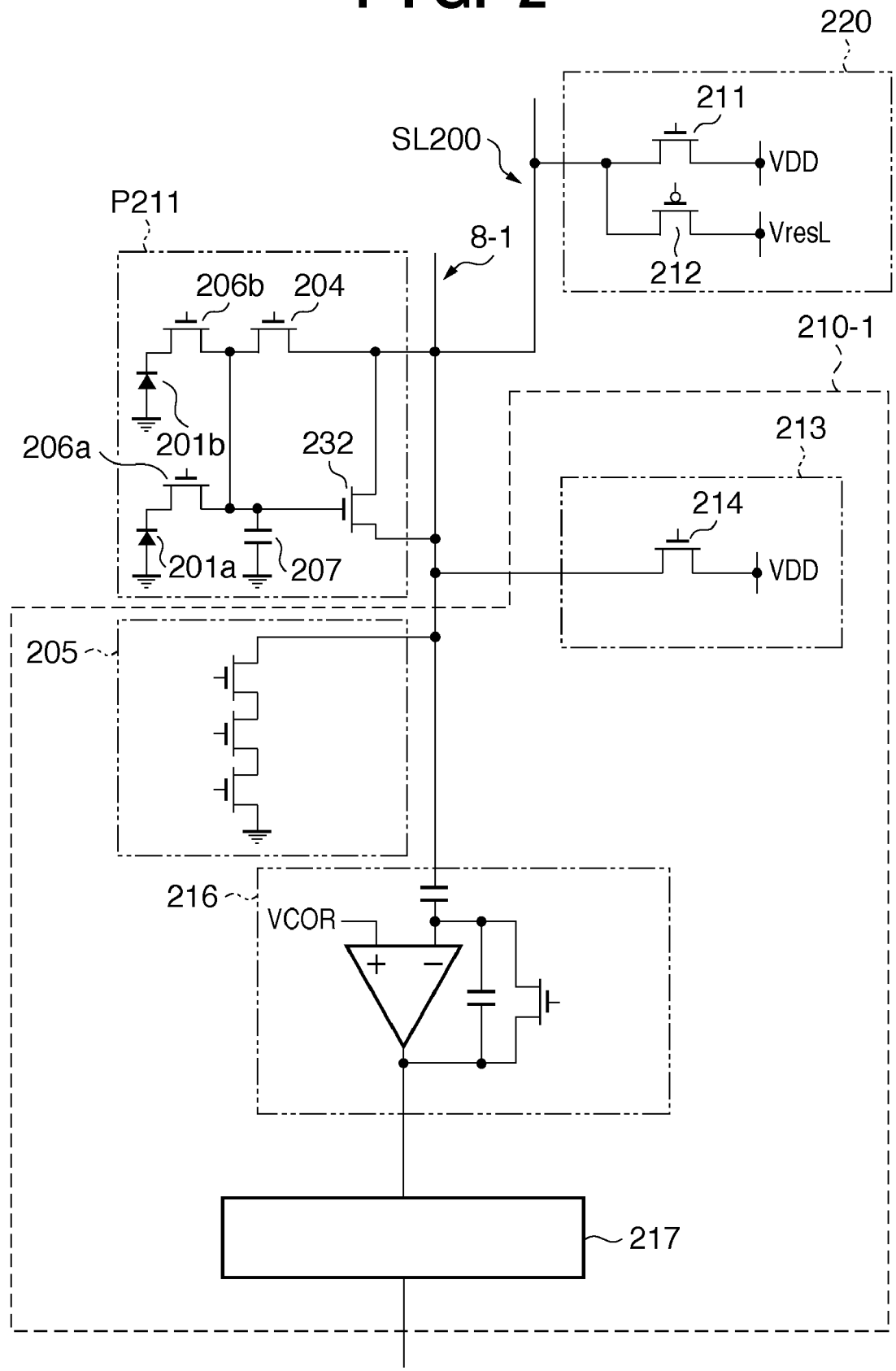
FIG. 2 is a circuit diagram showing the arrangement of pixels P211 to P2nm in a pixel array PA200, and that of noise reduction circuits 210-1 to 210-m.

The arrangement of the pixels P211 to P2nm in the pixel array PA200 will be explained with reference to FIG. 2. FIG. 2 is a circuit diagram showing the arrangement of the pixels P211 to P2nm in the pixel array PA200, and that of the noise reduction circuits 210-1 to 210-m. Although the arrangement of the pixel P211 will be exemplified, the arrangements of the remaining pixels P212 to P2nm are also equivalent to that of the pixel P211.

The pixel P211 includes photodiodes (photoelectric conversion units) 201a and 201b, an amplification MOS transistor 232, and a reset MOS transistor (setting unit) 204. The pixel P211 also includes transfer MOS transistors (transfer units) 206a and 206b, and a floating diffusion (FD) (charge-voltage converter) 207.

The photodiode 201a accumulates charges corresponding to incident light. Upon receiving an active-level transfer signal from the vertical scanning circuit 215 via the transfer row control line 203-1a, the transfer MOS transistor 206a is turned on to transfer the charges of the photodiode 201a to the FD 207.

The photodiode 201b accumulates charges corresponding to incident light. Upon receiving an active-level transfer signal from the vertical scanning circuit 215 via the transfer row control line 203-1b, the transfer MOS transistor 206b is turned on to transfer the charges of the photodiode 201b to the FD 207.

By sharing the FD 207 and amplification MOS transistor 232 between the two photodiodes 201a and 201b, the number of amplification MOS transistors per pixel can be decreased. Hence, the number of amplification MOS transistors connected to the column signal line 8-1 can be decreased.

Upon receiving an active-level reset signal via the reset row control line 202-1, the reset MOS transistor 204 is turned on to reset the FD 207. The reset MOS transistor 204 selects a pixel by setting the electric potential of the FD 207 to the first electric potential (e.g. VDD). The reset MOS transistor 204 deselects a pixel by setting the electric potential of the FD 207 to the second electric potential (e.g. VresL). As will be described later, the electric potential of an FD in a selected pixel changes to an electric potential corresponding to the transfer charge amount by transferring charges from the photodiode to the FD. The selected state is maintained at a desired change amount of the FD electric potential. In other words, the electric potential of an FD in a selected pixel changes to an electric potential between the first electric potential and a fourth electric potential with the selected state maintained. The fourth electric potential is a potential between the first electric potential and the second electric potential and is nearer to the first electric potential by the threshold voltage than the reference potential of the column signal line 8-1. The reference potential of the column signal line 8-1 is a potential of the column signal line 8-1 while the voltage supply unit 213 does not supply the set voltage VDD to the column signal line 8-1, for example, a ground potential when the amplification MOS transistor is of n-type, or a power supply potential VDD when the amplification MOS transistor is of p-type. This obviates the need to arrange a selection MOS transistor in the pixel P211. Instead, an amplification MOS transistor smaller in gate area than the selection MOS transistor is connected to the column signal line 8-1. Thus, the parasitic capacitance of the column signal line 8-1 can be reduced. The gate area (gate capacitance) of the amplification MOS transistor tends to be smaller than that of the selection MOS transistor because the gate length of the amplification MOS transistor is shortened to increase the amplification factor and improve the pixel characteristic (sensitivity).

As described above, the number of amplification MOS transistors connected to the column signal line 8-1 can be decreased. From this viewpoint, the parasitic capacitance of the column signal line 8-1 can be reduced. Further, by changing amplification MOS transistors other than those on a selected row to the accumulation state, or to the depletion state, the parasitic capacitance from the amplification MOS transistors can be reduced.

The drains of the reset MOS transistor 204 and amplification MOS transistor 232 are connected to a power supply line SL200 for supplying power of the first or second electric potential. A power supply switching circuit 220 is connected to the power supply line SL200. The power supply switching circuit 220 includes switches 211 and 212. When the switch 211 is turned on and the switch 212 is turned off, the first electric potential (e.g. a power supply potential VDD) is supplied to the power supply line SL200. When the switch 211 is turned off and the switch 212 is turned on, the second electric potential (e.g. a power supply potential VresL) is supplied to the power supply line SL200. The power supply switching circuit 220 can be connected to the power supply line SL200 at low impedance.

The FD 207 converts transferred charges into a voltage in accordance with the parasitic capacitance. The FD 207 functions as the input (floating node) of the amplification MOS transistor 232, and outputs a signal corresponding to the voltage of the FD 207 to the gate of the amplification MOS transistor 232.

In the selected state, the amplification MOS transistor 232 performs a source follower operation together with a constant current source 205 connected to the column signal line 8-1, outputting a signal corresponding to the voltage of the FD 207 to the column signal line 8-1.

The arrangement of the noise reduction circuits 210-1 to 210-n will be explained with reference to FIG. 2. Although the arrangement of the noise reduction circuit 210-1 will be exemplified, the arrangements of the remaining noise reduction circuits 210-2 to 210-n are also equivalent to that of the noise reduction circuit 210-1.

The noise reduction circuit 210-1 includes a voltage supply unit 213, the constant current source 205, a column amplifier 216, and a memory 217.

The voltage supply unit 213 includes a switch 214. In the first period, the switch 214 is turned on, and the voltage supply unit 213 supplies a set voltage having the third electric potential (e.g. a power supply potential VDD) to the column signal line 8-1.

Assume that, while the voltage supply unit 213 supplies the set voltage VDD to the column signal line 8-1, the constant current source keeps supplying a constant current to the column signal line 8-1. In this case, the source follower operation which is performed by the amplification MOS transistor of a pixel and the constant current source interferes with an operation to increase the electric potential of the column signal line 8-1 to the third electric potential which is performed by the voltage supply unit 213. The voltage supply unit 213 cannot execute this operation at high speed.

In contrast, according to the embodiment, the constant current source 205 does not supply a constant current to the column signal line 8-1 in the first period in which the voltage supply unit 213 supplies a constant voltage. Hence, the electric potential of the column signal line 8-1 can quickly rise to the third electric potential. The difference between the third electric potential and the first or fourth electric potential is smaller than the threshold voltage of an amplification MOS transistor in a selected pixel. In the first period, therefore, the amplification MOS transistor of the pixel is turned off while the electric potential of the FD in the selected pixel is maintained at the electric potential (electric potential between the first and fourth electric potentials) of the selected state. In other words, in the first period, the noise reduction circuit 210-1 performs a control operation of the electric potential of the column signal line 8-1 to turn off the amplification MOS transistor 232 in a selected pixel without deselecting a pixel. The amplification MOS transistor in the pixel can quickly change from the ON state (strong inversion state) to the OFF state (accumulation state).

In the second period, the switch 214 is turned off, and the voltage supply unit 213 stops supply of the set voltage VDD to the column signal line 8-1.

Assume that, while the voltage supply unit 213 does not supply the set voltage (e.g. a power supply voltage VDD) to the column signal line 8-1, the constant current source does not supply a constant current to the column signal line 8-1. In this case, the column signal line 8-1 changes to a floating state. The electric potential of the column signal line 8-1 may not decrease from the third electric potential to a predetermined electric potential (an electric potential at which the amplification MOS transistor of a pixel is turned on).

To solve this problem, according to the embodiment, the constant current source 205 supplies a constant current to the column signal line 8-1 in the second period in which the voltage supply unit 213 does not supply a constant voltage. Then, the amplification MOS transistor of a pixel and the constant current source 205 perform the source follower operation. The electric potential of the column signal line 8-1 can quickly decrease from the third electric potential to the predetermined electric potential. The difference between the predetermined electric potential and the first or fourth electric potential is greater than or equal to the threshold voltage of an amplification MOS transistor in a selected pixel. In the second period, therefore, the amplification MOS transistor of the pixel is turned on while the electric potential of the FD in the selected pixel is maintained at the electric potential (electric potential between the first and fourth electric potentials) of the selected state. That is, in the second period, the noise reduction circuit 210-1 performs a control operation of the electric potential of the column signal line 8-1 to turn on the amplification MOS transistor 232 in a selected pixel and output a signal based on the voltage of the FD 207 to the column signal line 8-1. In response to this, the amplification MOS transistor in the pixel can quickly change from the OFF state (accumulation state) to the ON state (strong inversion state).

In the first period, the noise reduction circuit 210-1 executes the following control. The noise reduction circuit 210-1 performs a control operation of the electric potential of the column signal line 8-1 to turn off the amplification MOS transistor 232 while the reset MOS transistor 204 of a selected pixel sets the electric potential of the FD 207 to the first electric potential.

In the second period, the noise reduction circuit 210-1 performs a control operation of the electric potential of the column signal line 8-1 to turn on the amplification MOS transistor 232 while the reset MOS transistor 204 of a selected pixel sets the electric potential of the FD 207 to the first electric potential. The amplification MOS transistor 232 outputs an N signal based on the voltage of the FD to the column signal line 8-1. The N signal is a signal output from the amplification MOS transistor 232 to the column signal line 8-1 while the reset MOS transistor 204 sets the FD 207 to the first electric potential.

In the third period subsequent to the second period, the noise reduction circuit 210-1 performs the following operation. The noise reduction circuit 210-1 performs a control operation of the electric potential of the column signal line 8-1 to turn off the amplification MOS transistor 232 while the transfer MOS transistors 206*a* and 206*b* of a selected pixel transfer the charges of the photodiodes 201*a* and 201*b* to the FD 207.

In the fourth period subsequent to the third period, the noise reduction circuit 210-1 performs the following operation. The noise reduction circuit 210-1 performs a control operation of the electric potential of the column signal line 8-1 to turn on the amplification MOS transistor 232 while the transfer MOS transistors 206*a* and 206*b* of a selected pixel transfer the charges of the photodiodes 201*a* and 201*b* to the FD 207. The amplification MOS transistor 232 outputs an S signal based on the voltage of the FD to the column signal line 8-1. The S signal is a signal output from the amplification MOS transistor 232 to the column signal line 8-1 while the transfer MOS transistors 206*a* and 206*b* transfer the charges of the photodiodes 201*a* and 201*b* to the FD 207.

In a reset state, the column amplifier (generation unit) 216 outputs its offset (first signal) to the memory 217.

The column amplifier 216 generates the difference signals between N and S signals at different timings output from a pixel on each column. The S signal is obtained by adding the N signal and a signal based on charges. By calculating the difference signal between S and N signals, a difference signal free from fixed-pattern noise generated by the amplification MOS transistor and kTC noise generated by the reset MOS transistor can be obtained. The column amplifier 216 outputs, to the memory 217, a signal (second signal) obtained by superposing an offset on the difference signal.

The memory 217 includes two sample-and-hold circuits S/H (N) and S/H(S). The sample-and-hold circuit S/H(N) samples the first signal output from the column amplifier 216, and holds the sampled first signal. The sample-and-hold circuit S/H(S) samples the second signal output from the column amplifier 216, and holds the sampled second signal.

When the horizontal scanning circuit 14 turns on the horizontal transfer switch 16-1, the sample-and-hold circuits S/H (N) and S/H(S) transfer the first and second signals, respectively, of a predetermined pixel to the output amplifier 17. The output amplifier 17 differentially amplifies the first and second signals, generating an image signal free from the offset of the column amplifier 216. The output amplifier 17 outputs the generated image signal from the output terminal 18.

Figure 3:
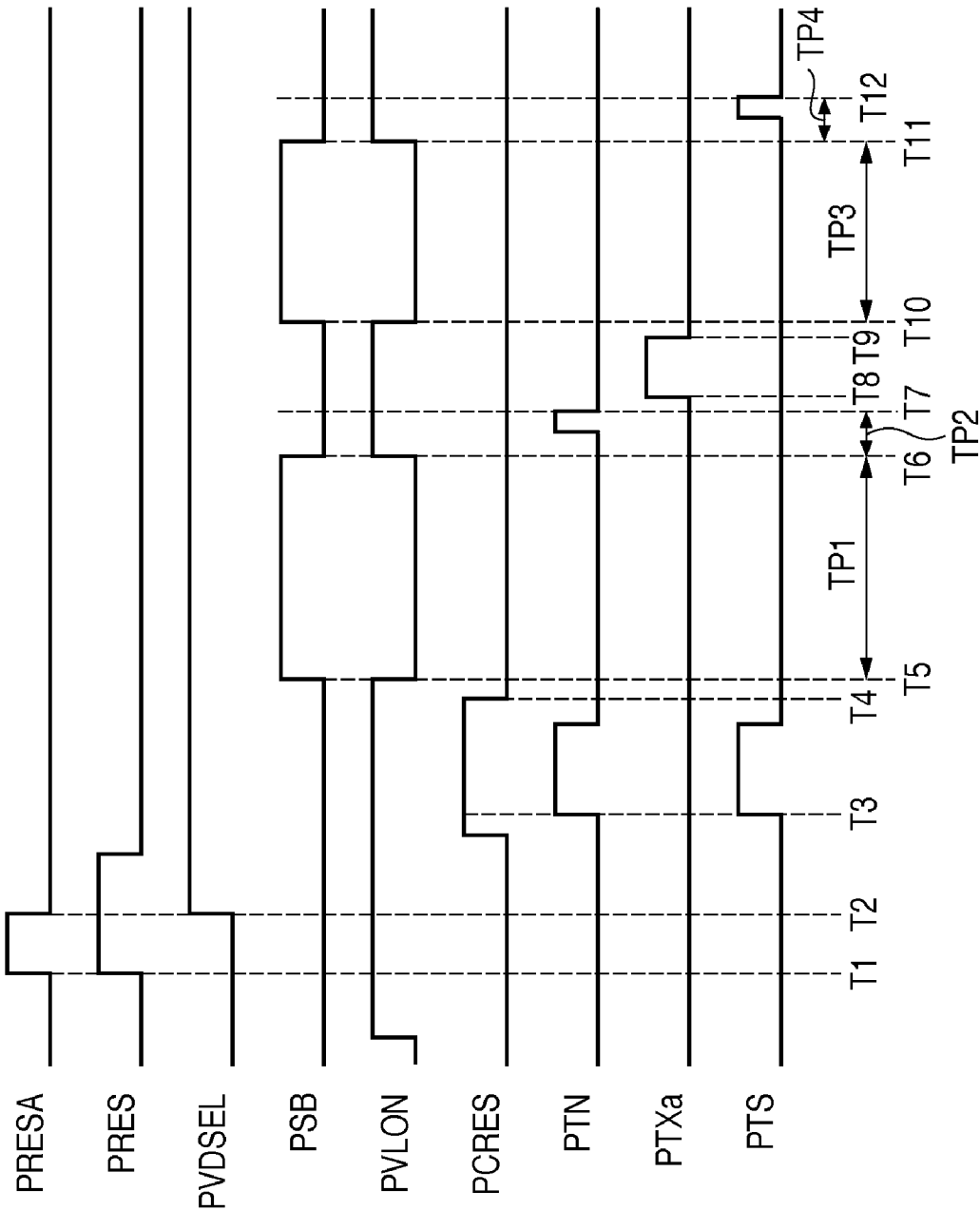
FIG. 3 is a timing chart showing the operation of the image sensor S200.

The operation of the image sensor S200 will be explained with reference to FIG. 3. FIG. 3 is a timing chart showing the operation of the image sensor S200. Although the operation of the pixel P211 will be exemplified in FIG. 3, the operations of the pixels P212 to P2nm are also equivalent to that of the pixel P211. A case where a signal corresponding to charges generated in the photodiode 201a is read out from the pixel P211 will be described. This also applies to a case where a signal corresponding to charges generated in the photodiode 201b is read out. In the following description, the MOS transistor is an NMOS (N-channel MOS or n-type MOS) transistor. However, the effects of the embodiment can also be obtained even when the type of the MOS transistor and the polarities of pulses are reversed.

A pulse PRESA is supplied from the vertical scanning circuit 215 to the gate of the reset MOS transistor 204 on a deselected row. A pulse PRES is supplied from the vertical scanning circuit 215 to the gate of the reset MOS transistor 204 on a selected row.

A pulse PVDSEL is supplied from the vertical scanning circuit 215 to the switches 211 to 212 to switch the ON/OFF states of the switches 211 and 212. When PVDSEL changes to L level, the switch 211 is turned off and the switch 212 is turned on. When PVDSEL changes to H level, the switch 211 is turned on and the switch 212 is turned off. The switch 211 includes, for example, an NMOS transistor, and the switch 212 includes, for example, a PMOS transistor.

A pulse PSB is supplied from the vertical scanning circuit 215 to the switch 214 to switch the ON/OFF state of the switch 214. The switch 214 is turned off when PSB changes to L level, and on when PSB changes to H level.

A pulse PVLON is supplied from the vertical scanning circuit 215 to the constant current source 205 to turn on/off the constant current source 205. The constant current source 205 is turned off when PVLON changes to L level, and on when PVLON changes to H level.

A pulse PCRES is supplied from the vertical scanning circuit 215 to the column amplifier 216, and is a reset pulse for the column amplifier 216. A pulse PTN is supplied from the vertical scanning circuit 215 to the sample-and-hold circuit S/H(N), and is used to sample and hold an N signal. A pulse PTXa is supplied from the vertical scanning circuit 215 to the gate of the transfer MOS transistor 206a in a pixel on a selected row. A pulse PTS is supplied from the vertical scanning circuit 215 to the sample-and-hold circuit S/H(S), and is used to sample and hold an S signal.

At timing T1 shown in FIG. 3, the pulse PVDSEL changes to L level to turn on the switch 212 and off the switch 211. In response to this, the second electric potential (e.g. a power supply potential VresL) is supplied to the power supply line SL200. The pulses PRESA and PRES change to H level to turn on the reset MOS transistors 204 on both deselected and selected rows. The FDs 207 of all the pixels are reset to the low electric potential VresL, deselecting all the pixels at once.

At timing T2, the pulse PVDSEL changes to H level to turn off the switch 212 and on the switch 211. In response to this, the first electric potential (e.g. a power supply potential VDD) is supplied to the power supply line SL200. The pulse PRESA changes to L level while the pulse PRES maintains H level. The FDs 207 of pixels on a selected row are reset to the high electric potential VDD, selecting only the pixels on the selected row. The amplification MOS transistors of the pixels on the selected row perform the source follower operation. Pixels on deselected rows remain deselected.

A plurality of amplification MOS transistors 232 belonging to a single column are connected to the column signal line 8-1. At this time, the source follower operation of a pixel on a selected row in which the reset electric potential VDD is written becomes effective. Hence, a signal (N signal) dependent on the electric potential of the FD 207 of the pixel on the selected row is output to the column signal line 8-1.

At timing T3, the pulses PCRES, PTN, and PTS change to H level to reset the column amplifier 216, sample-and-hold circuit S/H(N), and sample-and-hold circuit S/H(S).

At timing T4, the pulses PCRES, PTN, and PTS change to L level to complete resetting of the column amplifier 216, sample-and-hold circuit S/H(N), and sample-and-hold circuit S/H(S).

In the first period TP1 between timings T5 and T6, the pulse PSB has changed to H level. In the first period TP1, the switch 214 is turned on, and the voltage supply unit 213 supplies the set voltage (e.g. a power supply voltage VDD) having the third electric potential to the column signal line 8-1.

Also, the pulse PVLON has changed to L level in the first period TP1. This prevents the constant current source 205 from supplying a constant current to the column signal line 8-1 in the first period TP1 in which the voltage supply unit 213 supplies a constant voltage. The electric potential of the column signal line 8-1 can quickly increase to the third electric potential. The difference between the third electric potential and the first electric potential is smaller than the threshold voltage of an amplification MOS transistor in a selected pixel. In the first period TP1, therefore, the amplification MOS transistor in the selected pixel is turned off while the electric potential of the FD in the selected pixel is maintained at the electric potential (electric potential between the first and fourth electric potentials) of the selected state. That is, in the first period TP1, the noise reduction circuit 210-1 performs a control operation of the electric potential of the column signal line 8-1 to turn off the amplification MOS transistor 232 while the electric potential of the FD 207 in the selected pixel is maintained at an electric potential of the selected state. As a result, the amplification MOS transistor in the pixel can quickly change from the ON state (strong inversion state) to the OFF state (accumulation state).

To change the amplification MOS transistor of the pixel to a more reliable OFF state (deeper accumulation state), the third electric potential can be set higher than the first electric potential (e.g. a power supply potential VDD).

In the second period TP2 between timings T6 and T7, the pulse PSB has changed to L level. In the second period TP2, the switch 214 is turned off, and the voltage supply unit 213 has stopped a supply operation of the set voltage VDD to the column signal line 8-1.

Further, the pulse PVLON has changed to H level in the second period TP2. Then, the constant current source 205 supplies a constant current to the column signal line 8-1 in the second period TP2 in which the voltage supply unit 213 does not supply a constant voltage. The amplification MOS transistor of the pixel and the constant current source 205 perform the source follower operation, and the electric potential of the column signal line 8-1 can quickly decrease from the third electric potential to a predetermined electric potential. The difference between the predetermined electric potential and the first electric potential is greater than or equal to the threshold voltage of an amplification MOS transistor in a selected pixel. In the second period, the amplification MOS transistor in the selected pixel is turned on while the electric potential of the FD in the selected pixel is maintained at the electric potential (first electric potential) of the selected state. That is, in the second period TP2, the noise reduction circuit 210-1 performs a control operation of the electric potential of the column signal line 8-1 to turn on the amplification MOS transistor 232 while the electric potential of the FD 207 in the selected pixel is maintained at an electric potential of the selected state. The N signal is a signal output from the amplification MOS transistor 232 to the column signal line 8-1 while the reset MOS transistor 204 sets the FD 207 to the first electric potential. The amplification MOS transistor in the pixel can quickly change from the OFF state (accumulation state) to the ON state (strong inversion state).

In the second period TP2, the pulse PTN changes to H level at a timing immediately after the amplification MOS transistor 232 in the pixel on the selected row is turned on, and keeps at H level till the timing T7. The sample-and-hold circuit S/H(N) samples an N signal output from the amplification MOS transistor 232 in the pixel on the selected row.

The duration of the second period TP2 corresponds to that of the above-mentioned post-ON read period, and is shorter than the transition time T. This can reduce mixing of flicker noise in a signal output from an amplification MOS transistor in a pixel on a selected row.

At timing T7, the pulse PTN changes to L level. The sample-and-hold circuit S/H(N) holds the N signal output from the amplification MOS transistor 232 in the pixel on the selected row.

At timing T8, the pulse PTXa changes to H level. In the pixel on the selected row, the transfer MOS transistor 206a is turned on to transfer charges generated in the photodiode 201a to the FD 207. The FD 207 converts the transferred charges into a voltage. At this time, the transfer MOS transistor 206b in the pixel on the selected row receives an L-level pulse PTXb at the gate, and is OFF.

At timing T9, the pulse PTXa changes to L level, completing the charge transfer operation of the pixel on the selected row.

In the third period TP3 between timings T10 and T11, the pulse PSB has changed to H level, and the pulse PVLON has changed to L level. In response to this, the equivalent operation to that in the first period TP1 between timings T5 and T6 is executed. More specifically, the noise reduction circuit 210-1 performs the following operation in the third period TP3. The noise reduction circuit 210-1 performs a control operation of the electric potential of the column signal line 8-1 to turn off the amplification MOS transistor 232 while the transfer MOS transistor 206a of the selected pixel transfers the charges of the photodiode 201a to the FD 207. At this time, the electric potential of the FD 207 is lower than the first electric potential, but falls between the first and fourth electric potentials.

In the fourth period TP4 between timings T11 and T12, the pulse PSB changes to L level, and the pulse PVLON has changed to H level. Basically the equivalent operation to that in the second period TP2 between timings T6 and T7 is executed except for the following operation.

More specifically, the noise reduction circuit 210-1 performs the following operation in the fourth period TP4. The noise reduction circuit 210-1 performs a control operation of the electric potential of the column signal line 8-1 to turn on the amplification MOS transistor 232 while the transfer MOS transistor 206a of the selected pixel transfers the charges of the photodiode 201a to the FD 207. At this time, the electric potential of the FD 207 is lower than the first electric potential, but falls between the first and fourth electric potentials.

In the fourth period TP4, the pulse PTS changes to H level at a timing immediately after the amplification MOS transistor 232 in the pixel on the selected row is turned on, and keeps at H level till the timing T12. The sample-and-hold circuit S/H(S) samples an S signal output from the amplification MOS transistor 232 in the pixel on the selected row.

The duration of the fourth period TP4 corresponds to that of the above-mentioned post-ON read period, and is shorter than the transition time T. This can reduce mixing of flicker noise in a signal output from an amplification MOS transistor in a pixel on a selected row.

At timing T12, the pulse PTS changes to L level. The sample-and-hold circuit S/H(S) holds the S signal output from the amplification MOS transistor 232 in the pixel on the selected row.

As described above, in the first period TP1 and third period TP3, an amplification MOS transistor in a pixel on a selected row can quickly change from the ON state (strong inversion state) to the OFF state (accumulation state). In the second period TP2 and fourth period TP4, the amplification MOS transistor in the pixel on the selected row can quickly change from the OFF state (accumulation state) to the ON state (strong inversion state). With these operations, even if the number of pixels in the pixel array increases, the amplification MOS transistor can be turned off/on quickly.

Since the duration of each of the second period TP2 and fourth period TP4 is shorter than the transition time T, a signal can be read out within a predetermined period (transition time T) after turning on an amplification MOS transistor in a pixel on a selected row.

With these operations, even if the number of pixels in the pixel array increases, flicker noise can be reduced.

The relationship between CDS processing and flicker noise will be explained with reference to FIG. 9.

The present inventor has discovered a new problem that flicker noise irrelevant to N and S signals is contained in normal sampling of N and S signals, and that final flicker noise may be increased by calculating the difference between N and S signals.

To solve this new problem, according to the embodiment, the amplification MOS transistor 232 is turned off/on immediately before reading out N and S signals. Then, the N and S signals are sampled and held to calculate the difference between them, thereby reducing flicker noise based on the new problem.

Figure 9:
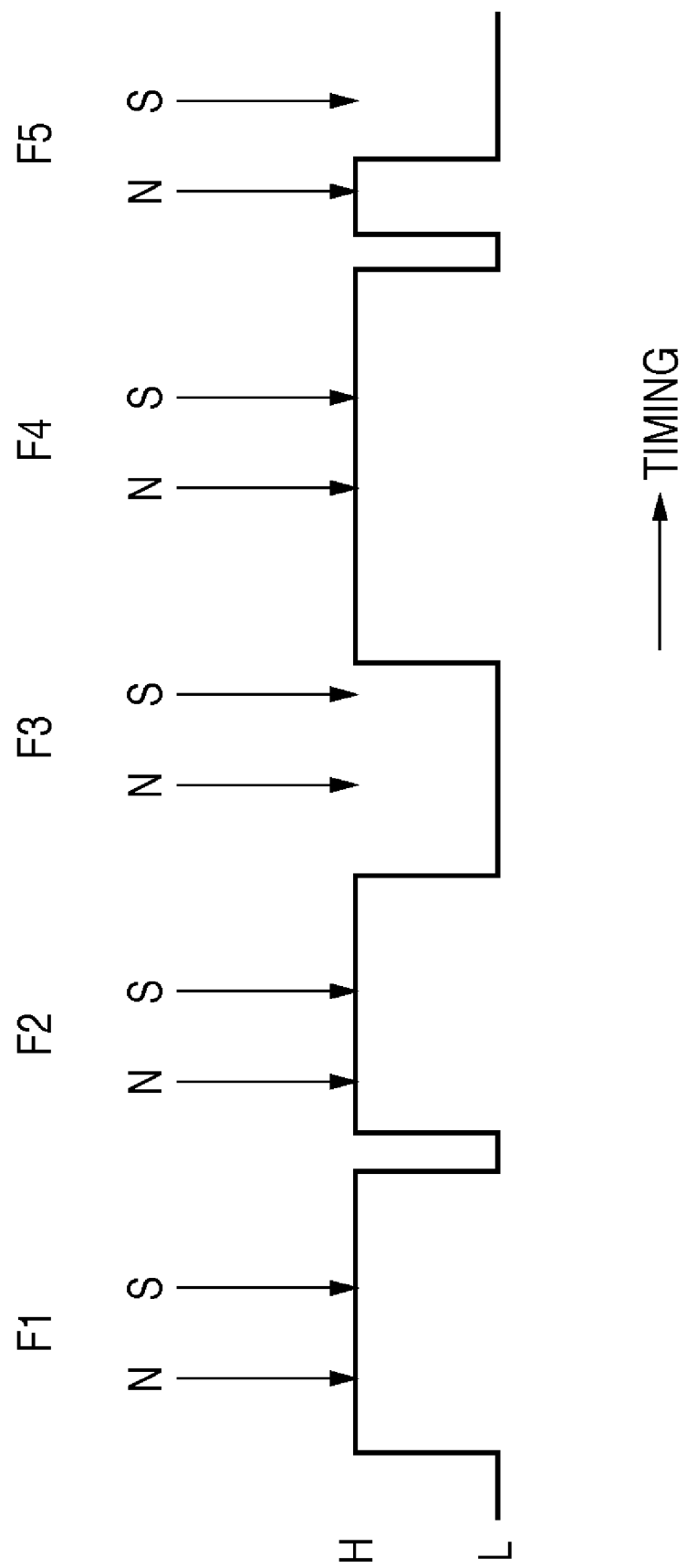
FIG. 9 is a timing chart for explaining the problem to be solved by the present invention.
Figure 10:
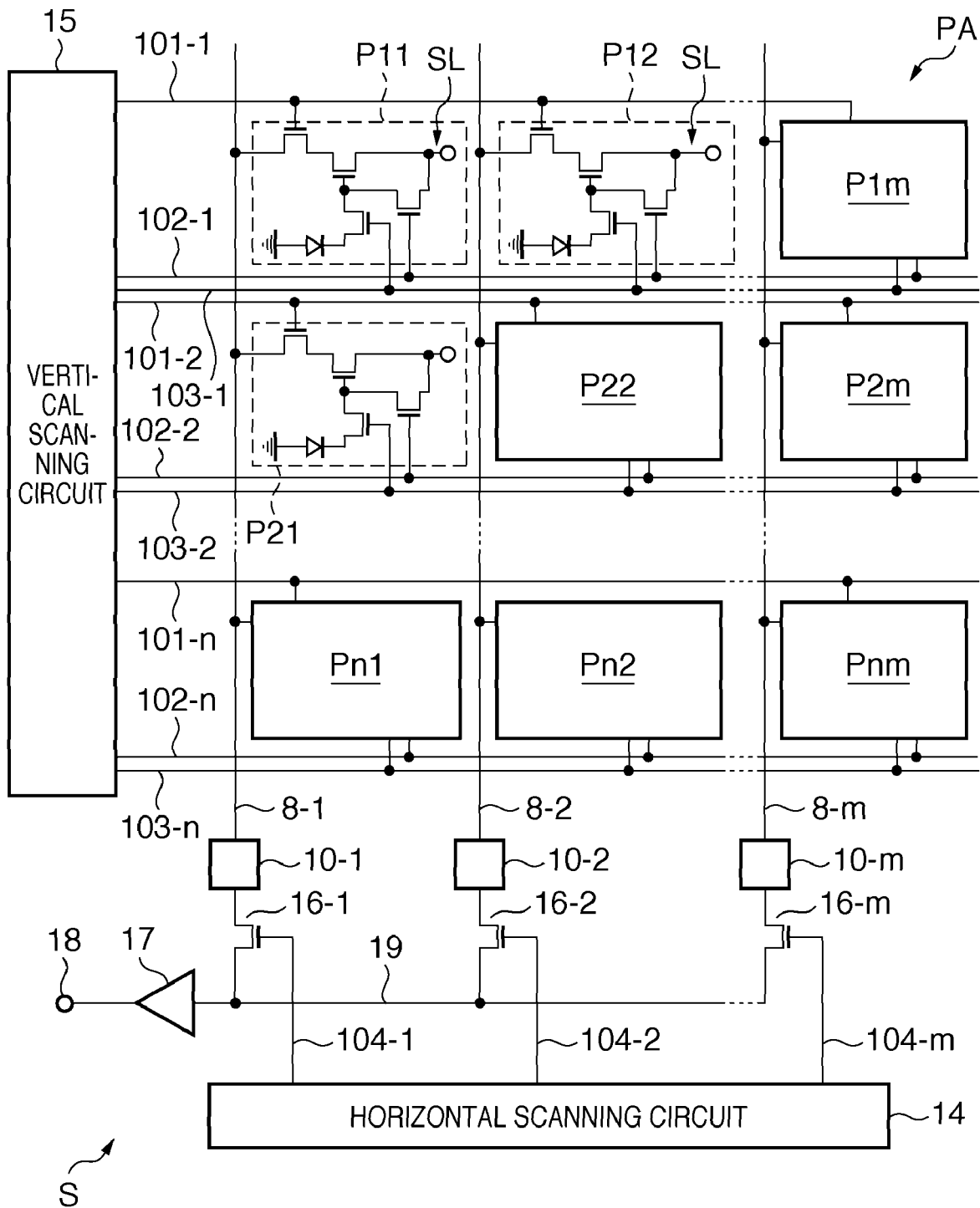
FIG. 10 is a diagram for explaining the prior art.
Figure 11:
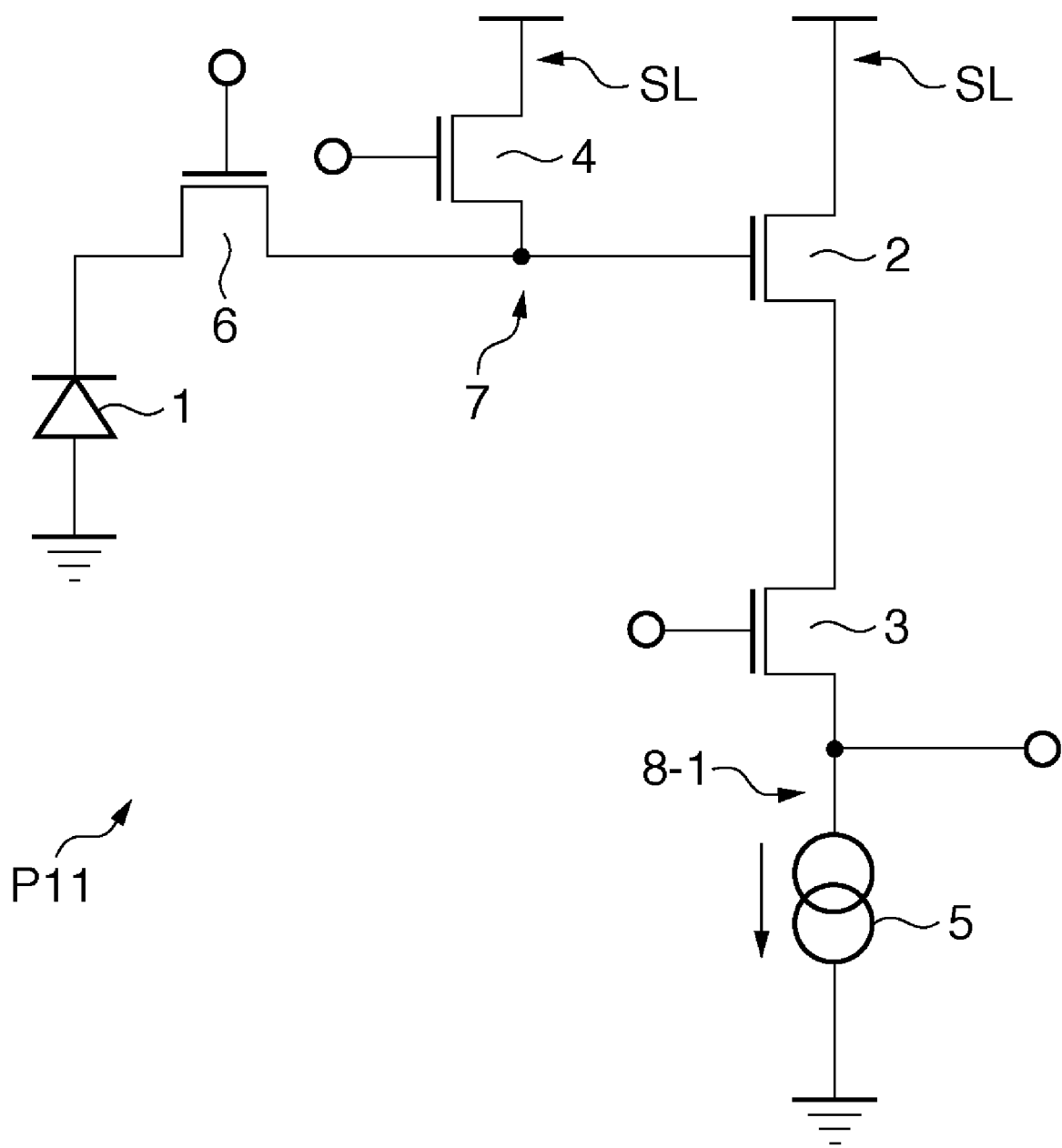
FIG. 11 is a circuit diagram for explaining the prior art.
Figure 12:
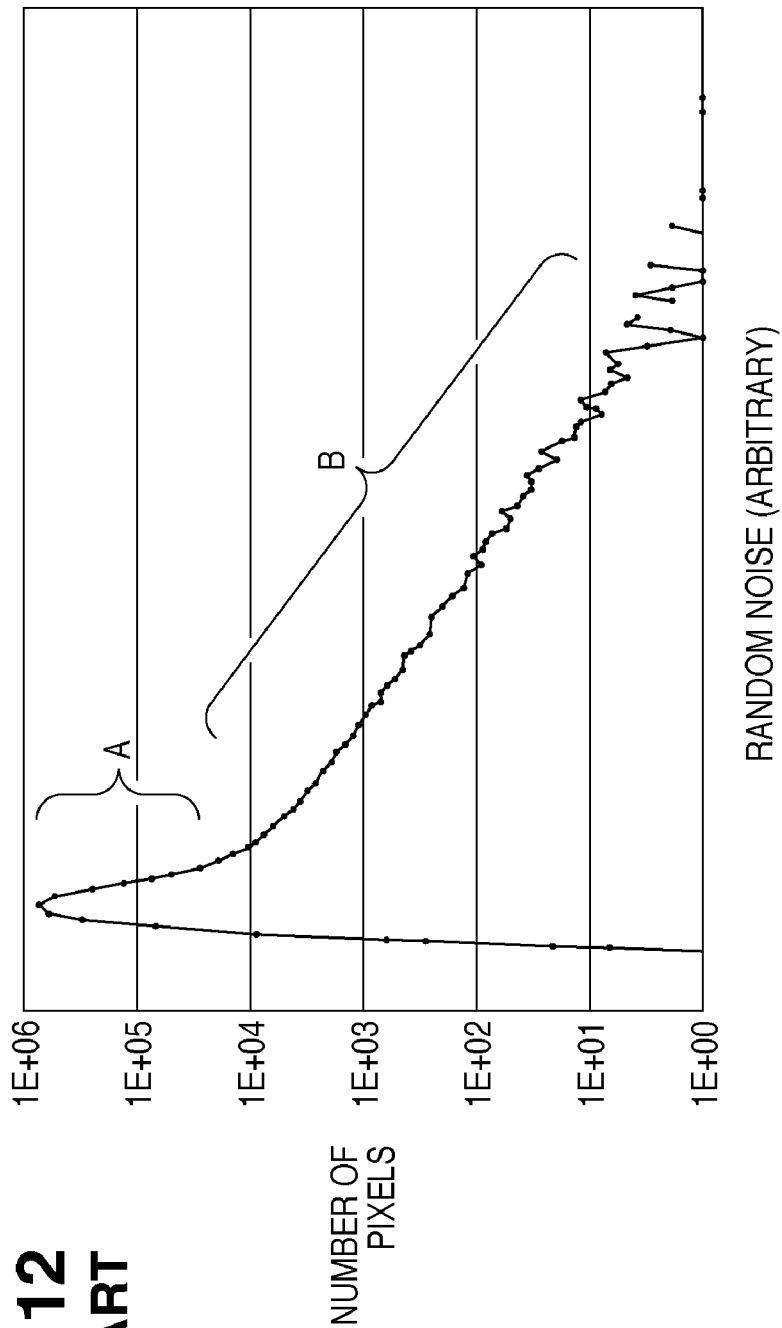
FIG. 12 is a graph for explaining the prior art.
Figure 13:
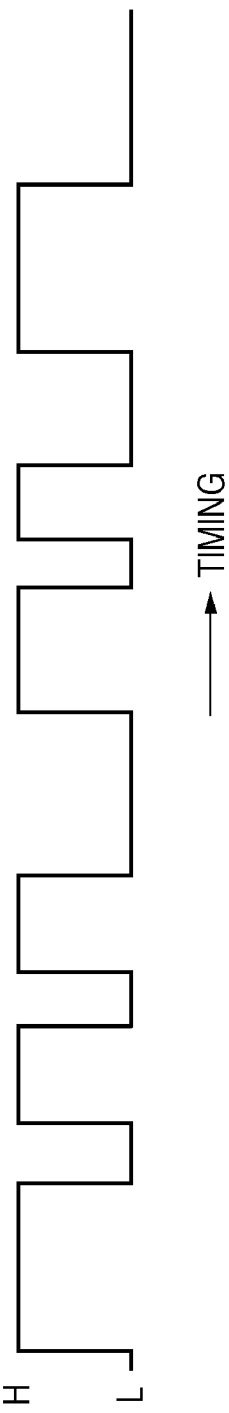
FIG. 13 is a timing chart for explaining the prior art.

FIG. 9 shows the relationship between a temporal change of flicker noise in a given pixel and read of N and S signals in each frame. Arrows in FIG. 9 indicate the read end points of N and S signals in frames F1 to F5. H and L represent flicker noise levels. By driving a column signal line at high speed by the arrangement of the embodiment, N and S signals can be read within the transition time T, and flicker noise is hardly mixed in N and S signals.

FIG. 9 shows a case where flicker noise is highly likely at relatively H level in the transition time T. More specifically, in the frames F1, F2, and F4, both N and S signals are read when flicker noise is at H level. In the frame F3, both N and S signals are read when flicker noise is at L level. At this time, the in-phase states of the N and S signals are canceled by calculating the difference between them, thereby removing flicker noise. In the frame F5, an N signal is read when flicker noise is at H level, and an S signal is read when flicker noise is at L level. If the difference between the N and S signals is calculated, the difference between the H and L levels remains as flicker noise in the difference signal.

In this embodiment, each of the duration of the second period TP2 and the fourth period TP4 is shorter than the transition time T. Because it is easy to shorten the third period TP3, it is possible to shorten the duration between the second period TP2 and the fourth period TP4 relative to the transition time T (see duration T7 to T11 of FIG. 3). Therefore, the embodiment can effectively reduce flicker noise generated in the case of the frame F5. The arrangement of the embodiment can more effectively remove (reduce) flicker noise by calculating the difference between N and S signals.

Figure 4:
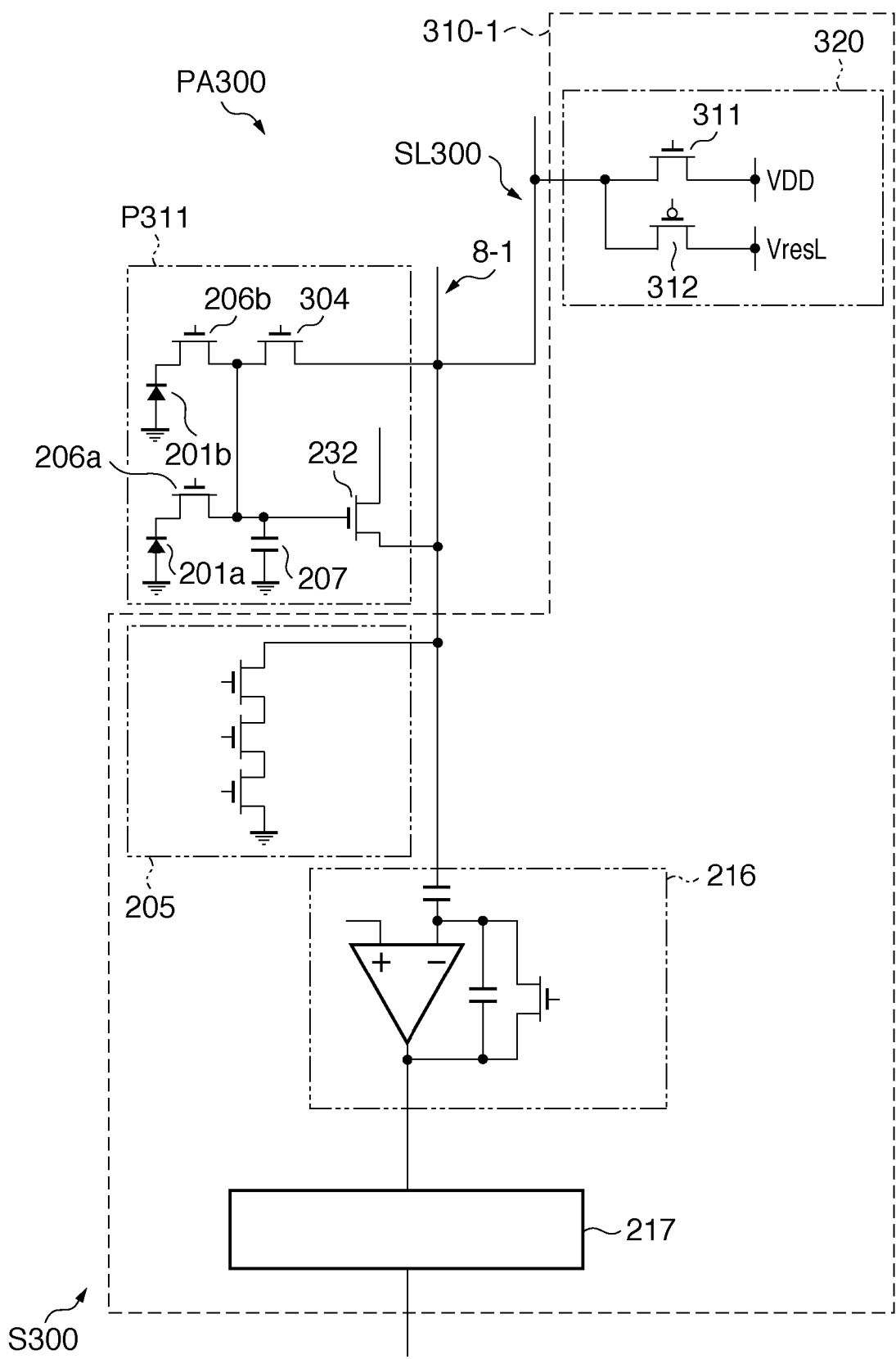
FIG. 4 is a diagram showing the arrangement of an image sensor S300 according to the second embodiment of the present invention.

An image sensor S300 according to the second embodiment of the present invention will be explained with reference to FIG. 4. FIG. 4 is a diagram showing the arrangement of the image sensor S300 according to the second embodiment of the present invention. A difference from the first embodiment will be mainly explained.

The second embodiment is different from the first embodiment in that the image sensor S300 includes a pixel array PA300, and noise reduction circuits (control units) 310-1 to 310-m.

A pixel P311 in the pixel array PA300 is different from the pixel P211 in the first embodiment in that the drain of a reset MOS transistor 304 is connected to a column signal line 8-1. The arrangements of remaining pixels P312 to P3nm are also equivalent to that of the pixel P311.

The noise reduction circuit 310-1 is different from the noise reduction circuit 210-1 in the first embodiment in that the noise reduction circuit 310-1 includes a power supply switching circuit (voltage supply unit) 320 instead of the voltage supply unit 213. The arrangements of the remaining noise reduction circuits 310-2 to 310-n are also equivalent to that of the noise reduction circuit 310-1.

The power supply switching circuit 320 is connected to the column signal line 8-1 via a power supply line SL300. The power supply switching circuit 320 includes switches 311 and 312. When the switch 311 is turned on and the switch 312 is turned off, the first electric potential (e.g. a power supply potential VDD) is supplied to the column signal line 8-1 via the power supply line SL300. When the switch 311 is turned off and the switch 312 is turned on, the second electric potential (e.g. a power supply potential VresL) is supplied to the column signal line 8-1 via the power supply line SL300. The power supply switching circuit 320 can be connected to the power supply line SL300 at low impedance.

The power supply switching circuit 320 functions not only as a power supply switching circuit but also as the voltage supply unit 213 in the first embodiment. To achieve this functionality, the gate of the switch 311 and 312 receive, for example, the pulse PVDSEL from the timing T1 to the timing T4 and the pulse PSB from the timing T5 to the timing T12.

In the first period TP1 between timings T5 and T6 shown in FIG. 3, the pulse PSB has changed to H level. In the first period TP1, the switch 311 is turned on, the switch 312 is turned off, and the power supply switching circuit 320 supplies the first electric potential (e.g. a power supply potential VDD) to the column signal line 8-1.

In the second period TP2 between timings T6 and T7, the pulse PSB has changed to L level. In the second period TP2, the switch 311 is turned off, the switch 312 is also turned off, and the power supply switching circuit 320 has stopped a supply operation of the first electric potential (e.g. a power supply potential VDD) to the column signal line 8-1.

In the third period TP3 between timings T10 and T11, the pulse PSB has changed to H level. In the third period TP3, the switch 311 is turned on, the switch 312 is turned off, and the power supply switching circuit 320 supplies power VDD of the first electric potential to the column signal line 8-1.

In the fourth period TP4 between timings T11 and T12, the pulse PSB has changed to L level. In the fourth period TP4, the switch 311 is turned off, the switch 312 is also turned off, and the power supply switching circuit 320 has stopped a supply operation of the first electric potential (e.g. a power supply potential VDD) to the column signal line 8-1.

In this way, the power supply switching circuit can turn off/on the amplification MOS transistor of a pixel on a selected row. This obviates the need to arrange a circuit dedicated to turn off/on an amplification MOS transistor apart from the power supply switching circuit, thereby reducing the layout area. Since the power supply can be connected at low impedance in both the ON and OFF operations, the response speed especially in the ON operation can be increased.

Figure 5:
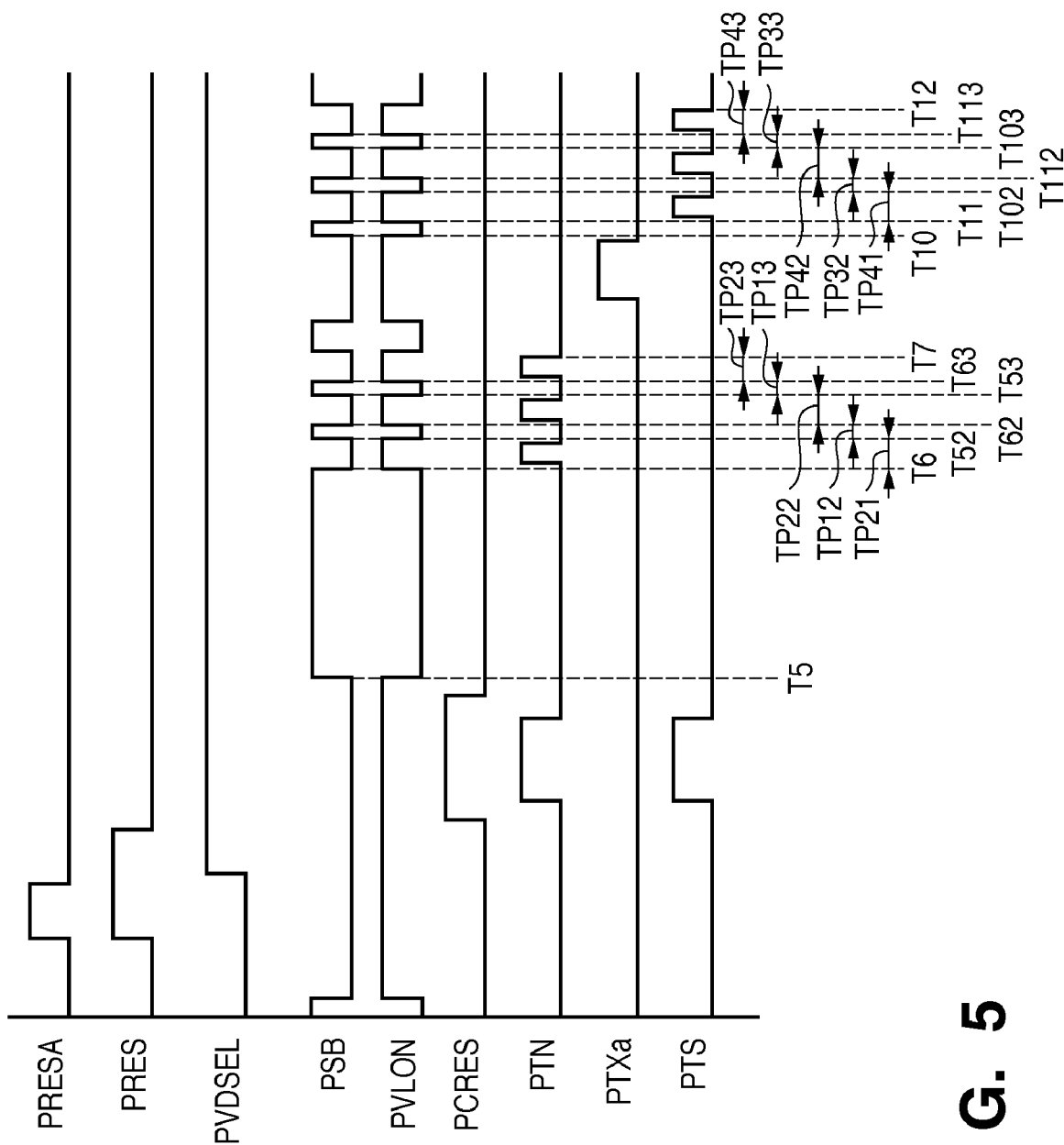
FIG. 5 is a timing chart showing the operation of an image sensor according to the third embodiment of the present invention.

An image sensor according to the third embodiment of the present invention will be explained with reference to FIG. 5. FIG. 5 is a timing chart showing the operation of the image sensor according to the third embodiment of the present invention. A difference from the first embodiment will be mainly explained.

The basic arrangement of the image sensor is equivalent to that in the first embodiment, but the operation is different from that in the first embodiment, as shown in FIG. 5.

Assume that the times during which the pulses PTN and PTS are at H level are shortened to end read of N and S signals within the transition time T. In this case, mixing of flicker noise in N and S signals can be reduced. However, N and S signals may not be able to be sampled satisfactorily.

To solve this problem, in the third embodiment, the times during which the pulses PTN and PTS are at H level are shortened. In addition, a signal of one pixel is sampled a plurality of number of times at short intervals.

For example, in a second period TP21 between timings T6 and T52 shown in FIG. 5, the pulse PSB has changed to L level. In the second period TP21, a switch 214 is turned off, and a voltage supply unit 213 has stopped a supply operation of the set voltage (e.g. a power supply voltage VDD) to a column signal line 8-1. The pulse PVLON has changed to H level. In the second period TP21, while the electric potential of an FD in a selected pixel is maintained at the electric potential (first electric potential) of the selected state, an amplification MOS transistor in the pixel is turned on.

In the second period TP21, the pulse PTN changes to H level at a timing immediately after an amplification MOS transistor 232 in the pixel on the selected row is turned on, and keeps at H level till the timing T52. With this operation, a sample-and-hold circuit S/H(N) samples an N signal output from the amplification MOS transistor 232 in the pixel on the selected row.

In the first period TP12 between timings T52 and T62, the pulse PSB has changed to H level. In the first period TP12, the switch 214 is turned on, and the voltage supply unit 213 supplies the set voltage VDD having the third electric potential to the column signal line 8-1.

Also, in the first period TP12, the pulse PVLON has changed to L level. In response to this, a constant current source 205 has stopped a supply operation of a constant current to the column signal line 8-1 in the first period TP12 in which the voltage supply unit 213 supplies a constant voltage.

In the second period TP22 between timings T62 and T53, the equivalent operation to that in the second period TP21 between timings T6 and T52 is done.

In the first period TP13 between timings T53 and T63, the equivalent operation to that in the first period TP12 between timings T52 and T62 is done.

In the second period TP23 between timings T63 and T7, the equivalent operation to that in the second period TP21 between timings T6 and T52 is done.

In this fashion, the N signal of one pixel is sampled a plurality of number of times, for example, three times at short time intervals.

After that, the pulse PTXa changes to H level. In the pixel on the selected row, a transfer MOS transistor 206a is turned on to transfer charges generated in a photodiode 201a to an FD 207. The FD 207 converts the transferred charges into a voltage. At this time, the electric potential of the FD changes to the electric potential (electric potential between the first and fourth electric potentials) of the selected state.

In the fourth period TP41 between timings T11 and T102, the pulse PSB has changed to L level. In the fourth period TP41, the switch 214 is turned off, and the voltage supply unit 213 has stopped a supply operation of the set voltage (e.g. a power supply voltage VDD) to the column signal line 8-1. The pulse PVLON has changed to H level. In the fourth period TP41, while the electric potential of an FD in a selected pixel is maintained at the electric potential (electric potential between the first and fourth electric potentials) of the selected state, an amplification MOS transistor in the pixel is turned on.

In the fourth period TP41, the pulse PTS changes to H level at a timing immediately after the amplification MOS transistor 232 in the pixel on the selected row is turned on, and keeps at H level till the timing T102. With these operations, a sample-and-hold circuit S/H(S) samples an S signal output from the amplification MOS transistor 232 in the pixel on the selected row.

In the third period TP32 between timings T102 and T112, the pulse PSB has changed to H level. In the third period TP32, the switch 214 is turned on, and the voltage supply unit 213 supplies the set voltage VDD having the third electric potential to the column signal line 8-1.

Also, in the third period TP32, the pulse PVLON has changed to L level. In response to this, the constant current source 205 has stopped a supply operation of a constant current to the column signal line 8-1 in the third period TP32 in which the voltage supply unit 213 supplies a constant voltage.

In the fourth period TP42 between timings T112 and T103, the equivalent operation to that in the fourth period TP41 between timings T11 and T102 is done.

In the third period TP33 between timings T103 and T113, the equivalent operation to that in the third period TP32 between timings T102 and T112 is done.

In the fourth period TP43 between timings T113 and T7, the equivalent operation to that in the fourth period TP41 between timings T11 and T102 is done.

In this way, the S signal of one pixel is sampled a plurality of number of times, for example, three times at short time intervals.

As described above, the times during which the pulses PTN and PTS are at H level are shortened. Further, a signal of one pixel is sampled a plurality of number of times at short intervals. Hence, mixing of flicker noise in N and S signals can be reduced, and N and S signals can be sampled sufficiently.

Figure 6:
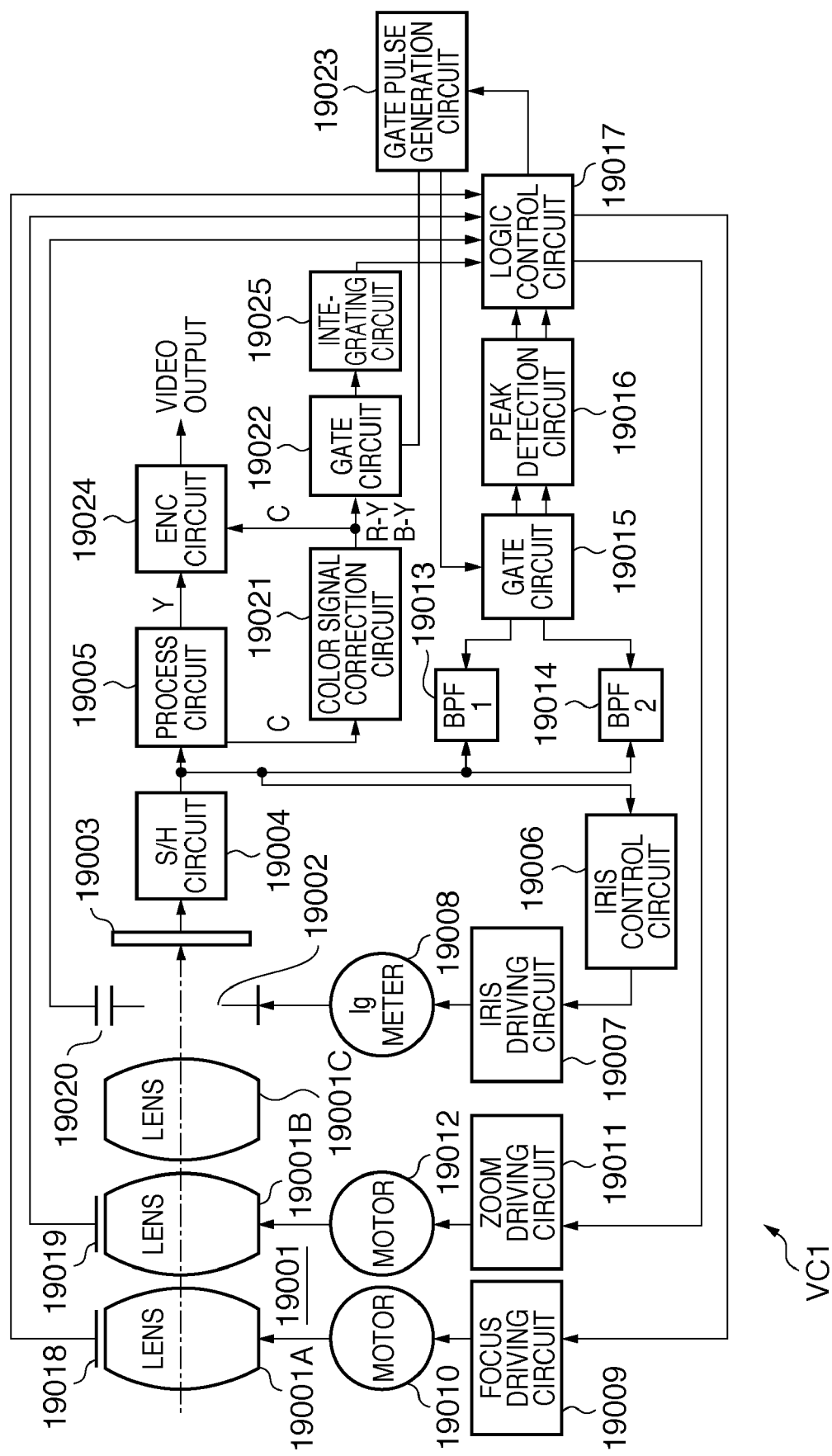
FIG. 6 is a block diagram showing an application of the image sensor according to the present invention to a movie video camera.

An application of the image sensor according to the present invention to a movie video camera will be described in detail with reference to FIG. 6. FIG. 6 is a block diagram showing an application of the image sensor according to the present invention to a movie video camera.

A movie video camera (imaging system) VC1 includes the following building components.

An optical system 19001 includes a focus lens 19001A for adjusting the focus by a photographing lens, a zoom lens 19001B for performing a zoom operation, and an imaging lens 19001C.

Reference numeral 19002 denotes a stop; and 19003, an image sensor. The image sensor 19003 receives, as an image signal, an object image formed on the image sensing surface. A sample-and-hold circuit (S/H circuit) 19004 samples and holds an image signal output from the image sensor 19003, and amplifies the level. N and S signals are independently output from the image sensor 19003 and held in the sample-and-hold circuit (S/H circuit) 19004. The image sensor 19003 can be configured by omitting an arrangement for performing CDS processing from the arrangement of the first embodiment. Then, the sample-and-hold circuit 19004 outputs image signals (N and S signals).

A processing circuit (generation unit) 19005 performs predetermined processing to, for example, perform CDS processing and generate a difference signal from image signals (N and S signals) output from the sample-and-hold circuit 19004. The processing circuit 19005 further performs gamma correction, color separation, and blanking processing for the difference signal, outputting a luminance signal Y and chroma signals C. A color signal correction circuit 19021 performs correction of white balance and color balance for the chroma signals C output from the processing circuit 19005, and outputs the resultant signals as color difference signals R-Y and B-Y.

The luminance signal Y output from the processing circuit 19005, and the color difference signals R-Y and B-Y output from the color signal correction circuit 19021 are modulated by an encoder circuit (ENC circuit) 19024, and output as standard television signals. The standard television signals are output to a video recorder (not shown), or a monitor EV (not shown) such as an electronic viewfinder.

The image sensor 19003 may also have the arrangement of the first embodiment. CDS processing may also be performed not in the processing circuit 19005 but in the image sensor 19003.

An iris control circuit 19006 controls an iris driving circuit 19007 on the basis of an image signal supplied from the sample-and-hold circuit 19004. The iris control circuit 19006 automatically controls an Ig meter 19008 to control the aperture value of the stop 19002 so as to set the maximum level, average level, or the like of the image signal to a predetermined level.

Bandpass filters (BPFs) 19013 and 19014 extract high-frequency components necessary for in-focus detection from an image signal output from the sample-and-hold circuit 19004. Signals output from the first bandpass filter (BPF1) 19013 and second bandpass filter (BPF2) 19014 are gated by a gate circuit 19015 in accordance with a focus gate frame signal. A peak detection circuit 19016 detects the peak value of each gated signal, and outputs the gated signal to the logic control circuit 19017. This signal is called a focus voltage, and the focus is adjusted in accordance with the focus voltage.

A focus encoder 19018 detects the moving position of the focus lens 19001A. A zoom encoder 19019 detects the focal length of the zoom lens 19001B. An iris encoder 19020 detects the aperture value of the stop 19002. The detection values of these encoders are supplied to the logic control circuit 19017 which controls the system.

The logic control circuit 19017 performs in-focus detection and focus adjustment for an object on the basis of an image signal corresponding to a set in-focus detection region. More specifically, the logic control circuit 19017 receives pieces of high-frequency component peak value information supplied from the bandpass filters 19013 and 19014 via the gate circuit 19015 and peak detection circuit 19016. Based on the pieces of peak value information, the logic control circuit 19017 supplies a control signal for a focus motor 19010 to a focus driving circuit 19009 to drive the focus lens 19001A to a position where the peak value of the high-frequency component is maximized. The control signal is used to control the rotational direction, rotational speed, rotation/stop, and the like of the focus motor 19010.

Figure 7:
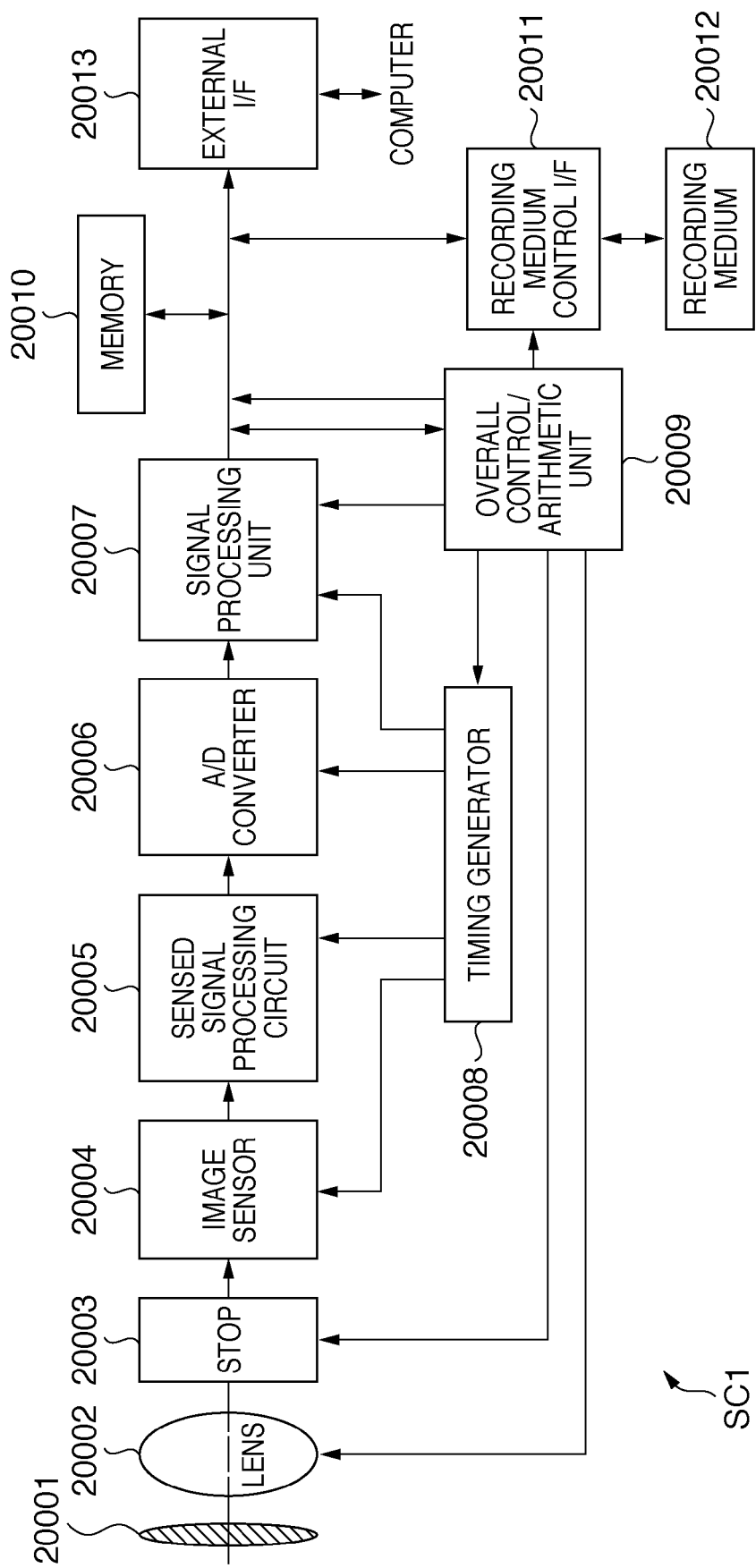
FIG. 7 is a block diagram showing an application of the image sensor according to the present invention to a still camera.

An application of the image sensor according to the present invention to a still camera will be described in detail with reference to FIG. 7. FIG. 7 is a block diagram showing an application of the image sensor according to the present invention to a still camera.

A still camera (imaging system) SC1 includes the following building components.

A barrier 20001 functions as both the lens protect and main switch. A lens 20002 forms the optical image of an object on an image sensor 20004. A stop 20003 changes the quantity of light passing through the lens 20002. The image sensor 20004 receives, as an image signal, an object image formed on the image sensing surface. The image sensor 20004 independently outputs N and S signals. The image sensor 20004 can be configured by omitting an arrangement for performing CDS processing from the arrangement of the first embodiment.

A sensed signal processing circuit 20005 performs CDS processing to generate the difference signal between N and S signals output from the image sensor 20004. The sensed signal processing circuit 20005 performs, for example, amplification processing to amplify the difference signal.

The image sensor 20004 may also have the arrangement of the first embodiment. CDS processing may also be performed not in the sensed signal processing circuit 20005 but in the image sensor 20004.

An A/D converter 20006 A/D-converts the difference signal output from the sensed signal processing circuit 20005. A signal processing unit 20007 executes various correction processes for image data output from the A/D converter 20006, and compresses data.

A timing generator 20008 outputs various timing signals to the image sensor 20004, sensed signal processing circuit 20005, A/D converter 20006, and signal processing unit 20007.

An overall control/arithmetic unit 20009 controls various arithmetic processes and the overall still camera.

A memory 20010 temporarily stores image data. A recoding medium interface 20011 performs recoding on or read from a recording medium. A detachable recoding medium 20012 such as a semiconductor memory performs recoding or read of image data. An external interface 20013 is used to communicate with an external computer or the like.

The operation of the still camera in shooting with the above-mentioned arrangement will be explained.

When the barrier 20001 opens, the main power supply is turned on. Then, the power supply of the control system is turned on, and the power supply of the image sensing circuit including the A/D converter 20006 is turned on.

To control the exposure, the overall control/arithmetic unit 20009 sets the stop 20003 to an open aperture value. A signal output from the image sensor 20004 is converted by the A/D converter 20006, and the converted signal is input to the signal processing unit 20007.

The overall control/arithmetic unit 20009 receives the image data processed by the signal processing unit 20007. Based on the received image data, the overall control/arithmetic unit 20009 performs photometry to determine the brightness. In accordance with the determination result, the overall control/arithmetic unit 20009 executes exposure control to control the opening degree of the stop 19002, the exposure time of the image sensor 20004, and the like.

Based on a signal output from the image sensor 20004, the overall control/arithmetic unit 20009 extracts a high-frequency component, executes distance measurement to calculate the distance to the object, and then determines whether the object is in focus. In accordance with the determination result, the overall control/arithmetic unit 20009 performs focus adjustment control to drive and control the optical system 19001.

After confirming the in-focus state, the overall control/arithmetic unit 20009 starts actual exposure.

After the end of actual exposure, the overall control/arithmetic unit 20009 causes the A/D converter 20006 to A/D-convert an image signal output from the image sensor 20004. Also, the overall control/arithmetic unit 20009 causes the signal processing unit 20007 to generate image data on the basis of the converted image signal. The overall control/arithmetic unit 20009 stores the generated image data in the memory 20010.

Then, the overall control/arithmetic unit 20009 records the data stored in the memory 20010 on the detachable recoding medium 20012 such as a semiconductor memory via the recoding medium control I/F.

The overall control/arithmetic unit 20009 supplies the data stored in the memory 20010 to an external computer or the like via the external I/F 20013. The user may also process an input image in the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-117628, filed Apr. 28, 2008 which is hereby incorporated by reference herein in its entirety.

What is claimed is:

1. An image sensor comprising:
a pixel array in which a plurality of pixels are arrayed two-dimensionally, each of the plurality of pixels including a photoelectric conversion unit, a charge-voltage converter, a transfer unit which transfers charges generated in the photoelectric conversion unit to the charge-voltage converter, a MOS transistor which outputs a signal based on a voltage of the charge-voltage converter to a signal line, and a setting unit which sets an electric potential of the charge-voltage converter to a first electric potential to set a selected state, and sets the electric potential of the charge-voltage converter to a second electric potential to set a deselected state; and
a control unit which performs, in a first period, a control operation of an electric potential of the signal line to turn off the MOS transistor while the electric potential of the charge-voltage converter in a selected pixel is maintained at an electric potential of the selected state, and performs, in a second period subsequent to the first period, a control operation of the electric potential of the signal line to turn on the MOS transistor while the electric potential of the charge-voltage converter in the selected pixel is maintained at an electric potential of the selected state.

2. The sensor according to claim 1, wherein the control unit includes
a constant current source which does not supply a constant current to the signal line in the first period, and supplies the constant current to the signal line in the second period, and
a voltage supply unit which supplies a set voltage having a third electric potential to the signal line in the first period, and does not supply the set voltage to the signal line in the second period, and an electric potential difference between the third electric potential and the first electric potential is smaller than a threshold voltage of the MOS transistor in the selected pixel.

3. The sensor according to claim 1, wherein
the control unit performs, in the first period, a control operation of the electric potential of the signal line to turn off the MOS transistor while the setting unit of a selected pixel sets the electric potential of the charge-voltage converter to the first electric potential, and performs, in the second period, a control operation of the electric potential of the signal line to turn on the MOS transistor while the setting unit of the selected pixel sets the electric potential of the charge-voltage converter to the first electric potential.

4. The sensor according to claim 1, wherein
the control unit performs, in the first period, a control operation of the electric potential of the signal line to turn off the MOS transistor while the transfer unit of a selected pixel transfers charges of the photoelectric conversion unit to the charge-voltage converter, and performs, in the second period, a control operation of the electric potential of the signal line to turn on the MOS transistor while the transfer unit of the selected pixel transfers charges of the photoelectric conversion unit to the charge-voltage converter.

5. The sensor according to claim 1, wherein
each of the plurality of pixels in the pixel array further includes
a second photoelectric conversion unit, and
a second transfer unit which transfers charges generated in the second photoelectric conversion unit to the charge-voltage converter.

6. An imaging system comprising:
an image sensor defined in claim 1;
an optical system which forms an image on an image sensing surface of the image sensor; and
a signal processing unit which processes a signal output from the image sensor to generate image data.

7. The system according to claim 6, wherein
the image sensor further comprises a generation unit which generates, for each pixel, a difference signal between a first signal which is output from the MOS transistor to the signal line while the electric potential of the charge-voltage converter has set to the first electric potential, and a second signal which is output from the MOS transistor to the signal line while the transfer unit has transferred charges of the photoelectric conversion unit to the charge-voltage converter, and
the signal processing unit processes the difference signal output from the generation unit to generate image data.

8. The system according to claim 6, wherein
the signal processing unit includes
a generation unit which generates, for each pixel, a difference signal between a first signal and a second signal which are output from the image sensor at different timings, and
a processing unit which processes the difference signal output from the generation unit to generate image data.

9. A method of controlling an image sensor having a pixel array in which a plurality of pixels are arrayed two-dimensionally, each of the plurality of pixels including a photoelectric conversion unit, a charge-voltage converter, a transfer unit which transfers charges generated in the photoelectric conversion unit to the charge-voltage converter, a MOS transistor which outputs a signal based on a voltage of the charge-voltage converter to a signal line, and a setting unit which sets an electric potential of the charge-voltage converter to a first electric potential to set a selected state, and sets the electric potential of the charge-voltage converter to a second electric potential to set a deselected state, the method comprising:
a first step of performing a control operation of an electric potential of the signal line to turn off the MOS transistor while the electric potential of the charge-voltage converter in a selected pixel is maintained at an electric potential of the selected state; and
a second step of performing, after the first step, a control operation of the electric potential of the signal line to turn on the MOS transistor while the electric potential of the charge-voltage converter in the selected pixel is maintained at the electric potential of the selected state.

* * * * *